United States Patent
More et al.

(10) Patent No.: US 11,295,325 B2
(45) Date of Patent: Apr. 5, 2022

(54) BENEFIT SURRENDER PREDICTION

(71) Applicant: ACCENTURE GLOBAL SOLUTIONS LIMITED, Dublin (IE)

(72) Inventors: Vijay More, Bangalore (IN); Shailesh Tukaram Kolambkar, Mumbai (IN); Shreeballav Sahoo, Bangalore (IN); Pushpa Somanna, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 19 days.

(21) Appl. No.: 16/915,708

(22) Filed: Jun. 29, 2020

(65) Prior Publication Data
US 2021/0406930 A1    Dec. 30, 2021

(51) Int. Cl.
*G06Q 10/00*    (2012.01)
*G06Q 30/02*    (2012.01)
*G06Q 10/06*    (2012.01)
*G06N 3/04*     (2006.01)

(52) U.S. Cl.
CPC .......... *G06Q 30/0202* (2013.01); *G06N 3/04* (2013.01); *G06Q 10/0635* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 2011/0016061 A1* | 1/2011 | Mercier | G06Q 40/08 705/36 R |
| 2011/0119095 A1* | 5/2011 | Mercier | G06Q 40/00 705/4 |
| 2012/0116999 A1* | 5/2012 | Mercier | G06Q 40/08 705/36 R |
| 2012/0158612 A1* | 6/2012 | Robertson | G06Q 40/06 705/36 R |

(Continued)

OTHER PUBLICATIONS

Milhaud, Xavier, Surrender triggers in life insurance: what main features affect the surrender behavior in a classical economic context?, 2011, HAL archives, https://hal.archives-ouvertes.fr/hal-00450003/document/, p. 1 -28.*

(Continued)

*Primary Examiner* — Joseph M Waesco
(74) *Attorney, Agent, or Firm* — Mannava & Kang, P.C.

(57) ABSTRACT

A benefit prediction requirement may be received and associated benefit data from a plurality of sources may be obtained. The benefit prediction requirement may be associated with determining a probability of a benefit being surrendered by a benefit user. Further, a plurality of benefit attributes may be identified and mapped with benefit user data to create a benefit surrender database. From the benefit surrender database, a survival probability and a hazard probability may be determined and benefit assessment data may be created therefrom. Based on the benefit assessment data, a benefit surrender prediction model including a surrender probability may be created and a surrender pattern of the benefit user may be determined. Furthermore, a benefit (Continued)

surrender result may be generated and a remedial action in response to the benefit prediction requirement may be performed.

20 Claims, 14 Drawing Sheets

(56) References Cited

U.S. PATENT DOCUMENTS

| | | | | |
|---|---|---|---|---|
| 2012/0290504 A1* | 11/2012 | Mercier | ............... | G06Q 40/04 705/36 R |
| 2013/0151283 A1* | 6/2013 | Ranicar, III | ........... | G06Q 40/00 705/2 |
| 2013/0246093 A1* | 9/2013 | Ranicar, III | ........... | G06Q 10/10 705/2 |
| 2014/0188557 A1* | 7/2014 | Martin, Jr | .............. | G06Q 10/10 705/7.29 |
| 2014/0372171 A1* | 12/2014 | Martin, Jr | .............. | G06Q 10/10 705/7.29 |
| 2016/0125545 A1* | 5/2016 | Behrens | ................ | G06Q 40/08 705/4 |
| 2020/0043098 A1* | 2/2020 | Patil | .................. | G06Q 30/0201 |
| 2020/0356851 A1* | 11/2020 | Li | ........................... | G06F 16/93 |

OTHER PUBLICATIONS

Avazpour et al. "V for Variety: Lessons Learned from Complex Smart Cities Data Harmonization and Integration", The First IEEE International Workshop on Context-Aware Smart Cities and Intelligent Transport Systems, 2016, (6 pages).

* cited by examiner

BENEFIT SURRENDER PREDICTION

BACKGROUND

Currently, various service sector trends, such as service related technology trends have been inclined towards adopting a predictive approach for various operations such as identifying new products, new clients, retaining clients, and revamping products. An organization may spend a vast amount of human and computational resources for such operations. For example, an organization may invest numerous resources in implementing strategies for client retention without comprehensive information about if a client may surrender a benefit and if the client does, information pertaining to when the client may surrender the benefit. While the organization may identify clients, who are likely to surrender their benefits and in response, the organization may implement preventive measures, such as sending promotional letters, emails, and supporting team communication to explain new products. However, these preventive measures may suffer from various shortcomings. For example, launching a client retention operation without any knowledge about the time scale during which a client is most likely to surrender a benefit may be ineffective. As a result, the service may be surrendered, thereby negatively impacting the revenue of the organization in a significant manner.

Presently, certain organizations may have migrated to the creation of management frameworks based on Artificial Intelligence (AI) based learning models to predict the clients who are most likely to surrender their benefits. However, such an approach may be counterproductive without the identification of an associated time scale of surrendering the benefit.

Accordingly, a technical problem with the currently available systems for identification of clients who are likely to surrender their benefits is that they may not be able to address key requirements, such as identification of a variable time scale during which a client is most likely to surrender a benefit. Additionally, there is a need for an approach that may optimize the framework for handling larger datasets with a lesser computation time for accurately predicting survivability of benefit.

DETAILED DESCRIPTION

Figure 1:
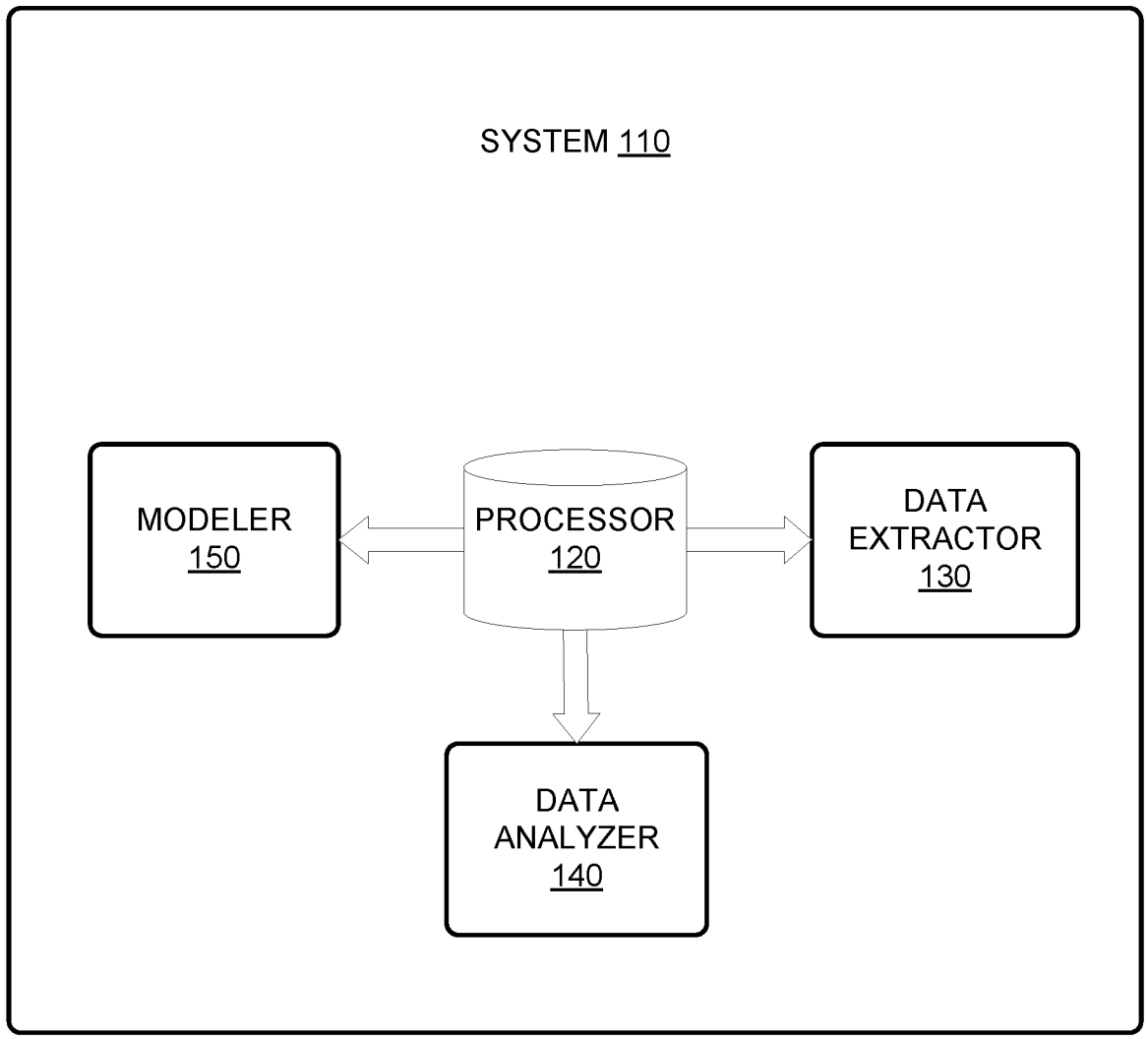
FIG. 1 illustrates a benefit surrender prediction system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for predicting the survivability of a benefit such as, for example, a policy at different time intervals such as a year, a month, a quarter, and the like. A benefit surrender prediction System (BSPS) hereinafter referred to as "system" may be used for automated identification and assessment of various benefit surrender influencing factors, such as client demographic, geographic details, benefit contract details, client banking details, and the like. For the purpose of this disclosure, the term benefit may refer to an insurance policy. An implementation of a deep learning driven predictive model on various policy surrender influencing factors may facilitate the creation of a deep learning driven predictive solution to estimate the time of occurrence of policy surrender by a policy user.

The system may include a processor coupled to a data extractor, a data analyzer, and a modeler. The data extractor may receive a benefit prediction requirement and obtain benefit data pertaining to the processing of the benefit prediction requirement from a plurality of sources. The benefit prediction requirement may be associated with determining a probability of a benefit being surrendered by a benefit user. The benefit may be relevant to a service such as an insurance policy provided to the benefit user by an organization. An artificial intelligence component may be implemented to identify a plurality of benefit attributes associated with the benefit from the benefit data. The plurality of benefit attributes may be mapped with benefit user data obtained from the plurality of sources to create a benefit surrender database.

The data analyzer may determine a survival probability of the benefit. The survival probability may be indicative of a first time duration for which the benefit may be active. For example, the survival probability may provide a probability indication for benefit to be active for a specific time duration. Further, the data analyzer may determine a hazard probability of the benefit. The hazard probability may be a probability indication of a hazard to survival of a benefit. For example, a benefit may be active for the specific time duration as indicated by the survival probability, the hazard probability may be a probability indication of the hazard to survival of the benefit after the specific time duration. The hazard probability may be indicative of a second time duration for which the benefit may be inactive. The benefit information from the benefit surrender database may be analyzed to determine the survival probability and the hazard probability. The survival probability of the benefit hazard probability of the benefit may be associated with the benefit user data to generate the benefit assessment data.

The neural network-based deep learning survival model may be implemented by the modeler to map the benefit assessment data with the plurality of benefit attributes to create a benefit surrender prediction model. The benefit surrender prediction model may include a surrender probability. The surrender probability may be indicative of a predicted time duration when the benefit may be surrendered. The surrender probability may be mapped with the plurality of benefit attributes and the benefit user data to determine a surrender pattern of the benefit user. A benefit surrender result comprising the surrender pattern of the benefit user, the surrender probability, and the predicted time duration for the benefit may be generated by the modeler. A remedial action may be performed in response to the benefit prediction requirement, based on the benefit surrender prediction model. The remedial action may include a determination of a benefit user retention strategy based on the benefit surrender result.

Accordingly, the benefit surrender prediction may identify a set of benefits such as a set of insurance policies that may eventually be surrendered. Such identification may help an organization to perform needful strategic actions for minimizing the impact of benefit surrenders. Additionally, estimation of the time of occurrence of the benefit surrender may enable timely actions to prevent surrendering of the benefits or providing an alternate benefit, and thus provide for client retention. Furthermore, the benefit surrender prediction may present an optimized solution, which may handle large data with lesser computational resource consumption and predict a time period of survivability of benefits.

FIG. 1 illustrates a system 110 for benefit surrender prediction, according to an example implementation of the present disclosure. In an example, the system 110 may include a processor 120. The processor 120 may be coupled to a data extractor 130, a data analyzer 140, and a modeler 150.

The data extractor 130 may receive a benefit prediction requirement. The benefit prediction requirement may be associated with determining a time-dependent conditional probability of a benefit being surrendered by a benefit user. The benefit may be relevant to a service such as an insurance benefit provided to the benefit user by an organization. The benefit user may be an individual who has subscribed to the benefit from an organization. The benefit prediction requirement may be associated with the identification of a benefit that may be surrendered by the benefit user along with a time bracket associated with the surrender of that particular benefit. The data extractor 130 may obtain benefit data pertaining to the processing of the benefit prediction requirement from a plurality of sources (referred to as data sources hereinafter). The benefit data may include historical data for an individual, benefit details, client demographics, and the like. The data sources may include various heterogeneous data sources such as those with high variability of data categories and data formats. Additionally, the data sources may include various homogenous data sources such as those comprising a similar type of data for example benefit user details.

An artificial intelligence component may be implemented to identify a plurality of benefit attributes (also referred to as benefit attributes) associated with the benefit from the benefit data. The artificial intelligence component may implement various techniques for data extraction and transformation for creating a synchronized dataset from the data received from the data sources. The data extraction and transformation techniques have been described in further detail by way of FIGS. 4-5B. The benefit attributes may include various measurable factors such as a benefit name, a benefit identification number, a benefit description, and the like associated with the benefit. Additionally, the benefit attributes may be various measurable factors that may significantly impact the surrender of the benefit such as loss of income leading to an inability to pay a subscription fees associated with the benefit. In an example embodiment, the artificial intelligence component may identify such benefit attributes from the benefit data.

The benefit attributes may be mapped with benefit user data obtained from the data sources to create a benefit surrender database. For example, the benefit details such as the benefit name, the benefit identification number, the benefit description, and the like may be mapped with benefit user data such as benefit user demographics (for example benefit user state, country, postal code), personal details (for example benefit user name, profession, income, number of dependent family members) to create the benefit surrender database. The benefit surrender database may include categories such as a subscription fees for a benefit held by a specific benefit user, a benefit maturity date, number of benefits owned by a benefit user, and the like. Few exemplary categories from the benefit surrender database have been presented herein by way of Table 1 included in the description of FIG. 4.

The data analyzer 140 may determine a survival probability of the benefit based on analyzing benefit information from the benefit surrender database. In accordance with various embodiments of the present disclosure, the survival model may be an Artificial Intelligence (AI) based deep learning convolutional neural network (described further by way of the description for subsequent Figs). The survival probability may be indicative of a first time duration for which the benefit may be active. For example, the survival probability may indicate that a benefit survives from the time origin to a specified time "t". Further, the survival model may be implemented to determine a hazard probability of the benefit based on analyzing benefit information from the benefit surrender database. The hazard probability may be indicative of a second time duration for which the benefit may be inactive. For example, the hazard probability may indicate that a benefit may be inactive from the specified time "t" to a specified time interval "∆t".

The survival probability and the hazard probability may be determined by analyzing the benefit information from the benefit surrender database. The survival model may analyze the benefit information from the benefit surrender database to determine the survival probability and the hazard probability for various time brackets such as weeks. The benefit information may include factors such as a time "t", which may be a time at which observation may be taken. Further, the factors may include a number "d", which may be a number of surrendered or dead or lapsed benefits at the given time "t". Furthermore, the factors may further include a number "n", which may be a number of the benefit users on whom benefit information may be available. Hence, "n" may denote the number of benefit users who may be at risk of surrendering a benefit (explained further by way of the description for FIG. 2). Therefore, the hazard probability and the survival probability may be determined for a group of "n" benefit users. The survival probability of the benefit hazard probability may be associated with the benefit user data to generate the benefit assessment data. The benefit assessment data may include, for example, details such as benefit users with the survival probability greater than hazard probability and benefit users with the survival probability lesser than hazard probability.

The modeler 150 may implement a neural network-based deep learning survival model (also referred to as survival model) to map the benefit assessment data with the benefit attributes to create a benefit surrender prediction model. The benefit surrender prediction model may include various categories from the benefit surrender database associated with benefit users such as those with the survival probability greater than hazard probability. The modeler 150 may implement the survival model for the aforementioned mapping. The benefit surrender prediction model may include a surrender probability. The surrender probability may be indicative of a predicted time duration when the benefit may be surrendered. The surrender probability may be a conditional probability based on a benefit surviving a stipulated time and failing thereafter. The stipulated time after which a benefit may become inactive may be the predicted time duration. The surrender probability may be determined by mapping the survival probability with the hazard probability (explained further by way of the description for FIG. 2)

The surrender probability may be mapped with the benefit attributes and the benefit user data to determine a surrender pattern of the benefit user. The surrender pattern may indicate which categories of benefit users are most likely to surrender a benefit at a specified time. For example, the surrender pattern may indicate a likelihood of the benefit users belonging to a particular profession, a particular region, a particular benefit group, and the like surrendering a benefit. It must be appreciated that the surrender pattern may generate many such insights from amalgamating the surrender probability with the benefit attributes and the benefit user data.

The modeler 150 may generate a benefit surrender result comprising the surrender pattern of the benefit user, the surrender probability, and the predicted time duration for the benefit. The survival model may implement a cognitive learning operation to update the benefit surrender database, the benefit surrender prediction model, the surrender probability, the predicted time duration, and the benefit surrender result based on an update in the benefit data. A remedial action may be performed in response to the benefit prediction requirement, based on the benefit surrender result. For example, the remedial action may include a determination of a benefit user retention strategy based on the benefit surrender result.

For the sake of brevity and technical clarity, the description of the system 110 may be restricted to a few exemplary embodiments; however, to a person skilled in the art, it should be clear that the system 110 may be used for the fulfillment of various advertisement and marketing content creation requirements and visual saliency predictions other than those mentioned hereinafter.

Figure 2:
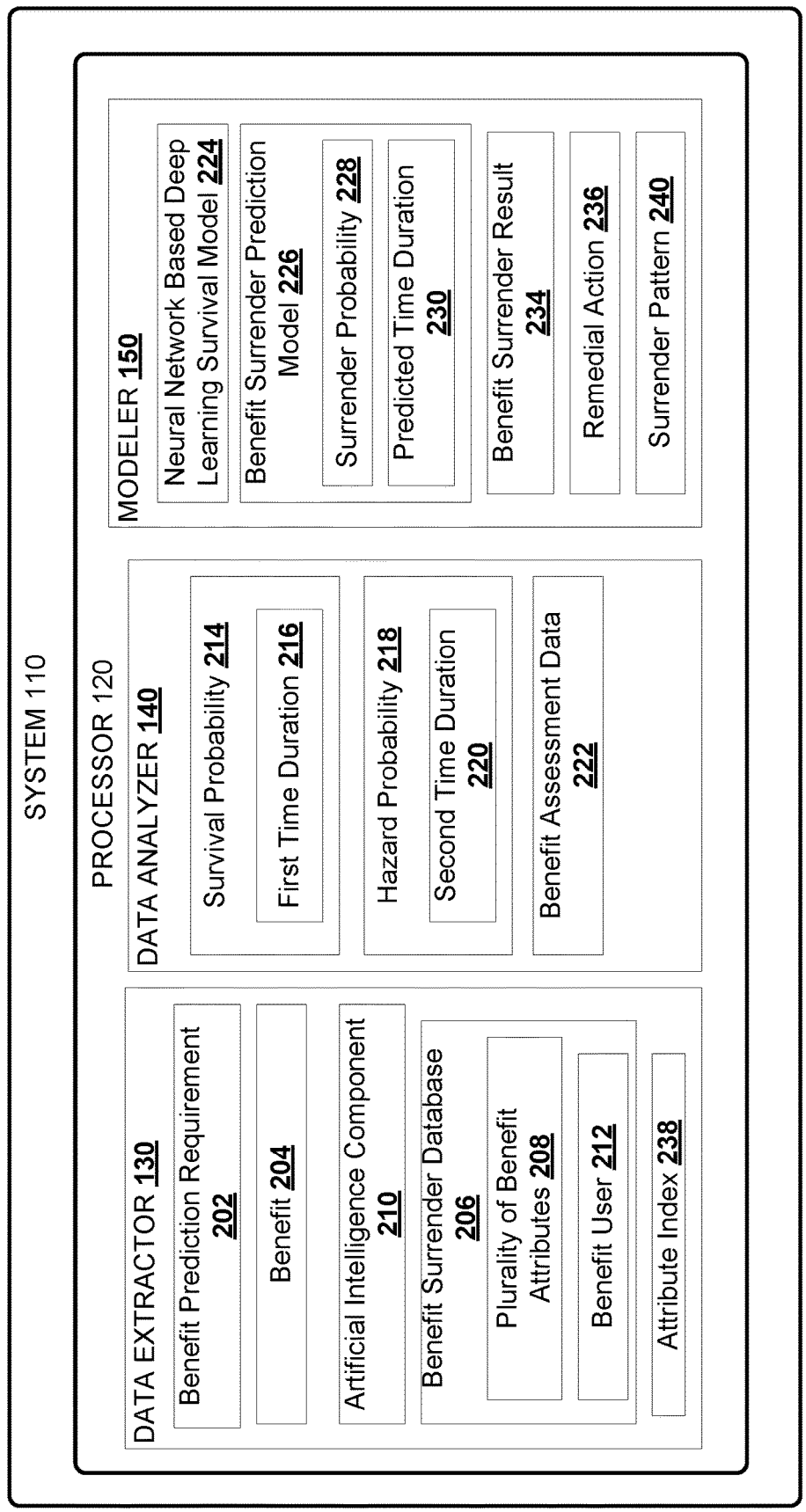
FIG. 2 illustrates various components of the benefit surrender prediction system, according to an example embodiment of the present disclosure.

FIG. 2 illustrates various components of a benefit surrender prediction system 200, according to an example embodiment of the present disclosure. The system 200 may be an exemplary embodiment of the system 110 described with respect to the description for FIG. 1. Any of the components of the system 110 may be deployed by the system 200 and may be referred to for describing the system 200. In an example embodiment, the system 200 may include the processor 120. The processor 120 may be coupled to the data extractor 130, the data analyzer 140, and the modeler 150.

The data extractor 130 may receive a benefit prediction requirement 202. The benefit prediction requirement 202 may be associated with determining a probability of a benefit 204 being surrendered by a benefit user 212. The benefit 204 may be relevant to a service such as an insurance benefit provided to the benefit user 212 by an organization. The data extractor 130 may obtain benefit data pertaining to the processing of the benefit prediction requirement from various data sources. In an example, an artificial intelligence component 210 may be implemented to identify a plurality of benefit attributes 208 (referred to as benefit attributes 208 hereinafter) associated with the benefit 204 from the benefit data. The artificial intelligence component 210 may implement various techniques for data extraction and transformation for creating a synchronized dataset from the data received from the data sources. In an exemplary embodiment, the Artificial Intelligence (AI) techniques for data extraction and transformation may include analytical algorithms, boosting algorithms, and the like. In another example, an Extract Transform Load (ETL) approach may be used to identify the benefit attributes 208 associated with the benefit 204 from the benefit data. The data extractor 130 may use Structured Query Language (SQL) queries for deploying the ETL approach. The ETL approach may use tools such as Talend™, ANSI SQL, and the like to identify the benefit attributes 208 associated with the benefit 204 from the benefit data. In accordance with various embodiments of the present disclosure, the data extractor 130 may choose between the AI techniques and the ETL techniques for data extraction and transformation based on size of the benefit data. For example, the data extractor 130 may implement the AI techniques if the size of the benefit data may be above a pre-defined threshold data size. The pre-defined threshold data size may be determined by an authorized personnel. In an example, the pre-defined threshold data size may be determined by a user of the system 110. The pre-defined threshold data size may be stored in the system 110. In an example, the data extractor 130 may obtain input from a user for choosing between the AI techniques and the ETL techniques for data extraction and transformation. In another example, the data extractor 130 may implement both, the AI techniques, and the ETL techniques for data extraction and transformation to identify the benefit attributes 208 associated with the benefit 204 from the benefit data.

The data extractor 130 may transform the benefit data obtained from the data sources to create a harmonized benefit dataset. In accordance with various embodiments of the present disclosure, the benefit surrender database includes the harmonized benefit dataset. The data extractor 130 may create the benefit surrender database from the harmonized benefit dataset. The transformation of the benefit data to create the harmonized dataset has been explained further by way of the description for the FIG. 5A. In an example embodiment, the artificial intelligence component 210 may be implemented to transform the benefit data obtained from the data sources to create the harmonized benefit dataset.

The benefit attributes 208 may be mapped with benefit user data obtained from the data sources to create a benefit surrender database 206. Few exemplary categories from the benefit surrender database have been presented herein by way of Table 1 included in the description of FIG. 4. In accordance with various embodiments of the present disclosure, the benefit surrender database may include an attribute index 238 for the benefit user 212. The attribute index 238 may include a benefit attribute from the benefit attributes 208 associated with a corresponding benefit user 212. The artificial intelligence component 210 may map the benefit attributes 208 with the benefit user data for a specific user to create the attribute index 238. For example, if a benefit user 212 may have listed various family members as dependents, then any of the benefit attributes 208 associated with benefit dependents may be added to the attribute index 238 for that user. Additionally, the benefit attributes 208 that may not apply to a user may be removed from a dataset relevant for the benefit user 212. For example, a user falling in a specific income bracket, therefore any of the benefit attributes 208 related to loss of income may be removed from the dataset for that particular user.

The data analyzer 140 may determine a survival probability 214 of the benefit 204. The survival probability may be indicative of a first time duration 216 for which the benefit 204 may be active. For example, the survival probability 214 may indicate that the benefit 204 survives from the time origin to a specified time "t". Further, the data analyzer 140 may determine a hazard probability 218 of the benefit 204. The hazard probability may be indicative of a second time duration 220 for which the benefit 204 may be inactive. For example, the hazard probability 218 may indicate that the benefit 204 may be inactive from the specified time "t" to a specified time interval "Δt".

The data analyzer 140 may perform an Exploratory Data Analysis (EDA) of the benefit surrender database to determine the survival probability 214, the first time duration 216, the hazard probability 218, and the second time duration 220. In an example embodiment, the EDA may include a Kaplan Meier survival analysis technique. The survival probability 214 may be determined using a survival function. The survival function gives a probability that the benefit 204 may survive longer than some specified time, "t". The survival probability 214 may be monotonically decreasing and as the time "t" may increase, the survival probability 214 may decrease. Additionally, the survival probability 214 may be taken as one "1" when the EDA may be implemented with a value of "t" as zero (0) and it may decrease as the time "t" may increase. In an example embodiment, the survival probability 214 may be defined by Equation:

$$S(t)=P(T \geq t) \quad \text{Equation 1}$$

wherein,
S(t)=the survival probability 214;
T=nonnegative random variable representing a benefit surrender time of a benefit user;
t=a specified time bracket (the first time duration 216); and
p=probability.

The hazard probability 218 may be determined using a hazard function. The hazard function indicates a conditional failure rate of the benefit 204 becoming inactive during the second time duration 220 after the benefit 204 has been active during the first time duration 216. For example, the hazard probability 218 may indicate that the benefit 204 may become inactive during a time interval "Δt" after the benefit 204 has been active from the origin time to the specified time "t". In an example embodiment, the second time duration 220 may be a successive time interval to the first time duration 216. Therefore, the hazard probability 218 may indicate the benefit 204 may become inactive during the second time duration 220 after the benefit 204 has survived during the first time duration 216. In an example embodiment, the survival probability 214 may be defined by Equation:

$$h(t) = \lim_{\Delta t \to 0} \left( \frac{p(\text{an individual surrender the benefit in the interval } (t + \Delta t), \text{given the individual has survived to } t)}{\Delta t} \right) \quad \text{Equation 2}$$

wherein,
h(t)=the hazard probability 218;
Δt=the second time duration 220;
p=probability; and
t=the first time duration 216.

The survival probability 214 may focus on the probability of the benefit 204 not being surrendered, while the hazard probability 218 may focus on the benefit 204 being surrendered. Additionally, the survival probability 214 may be inversely proportional to the hazard probability 218. Thus, higher the value of the survival probability 214 for a given time "t", smaller may be the hazard probability 218 for the same given time "t" and vice versa.

Figure 10:
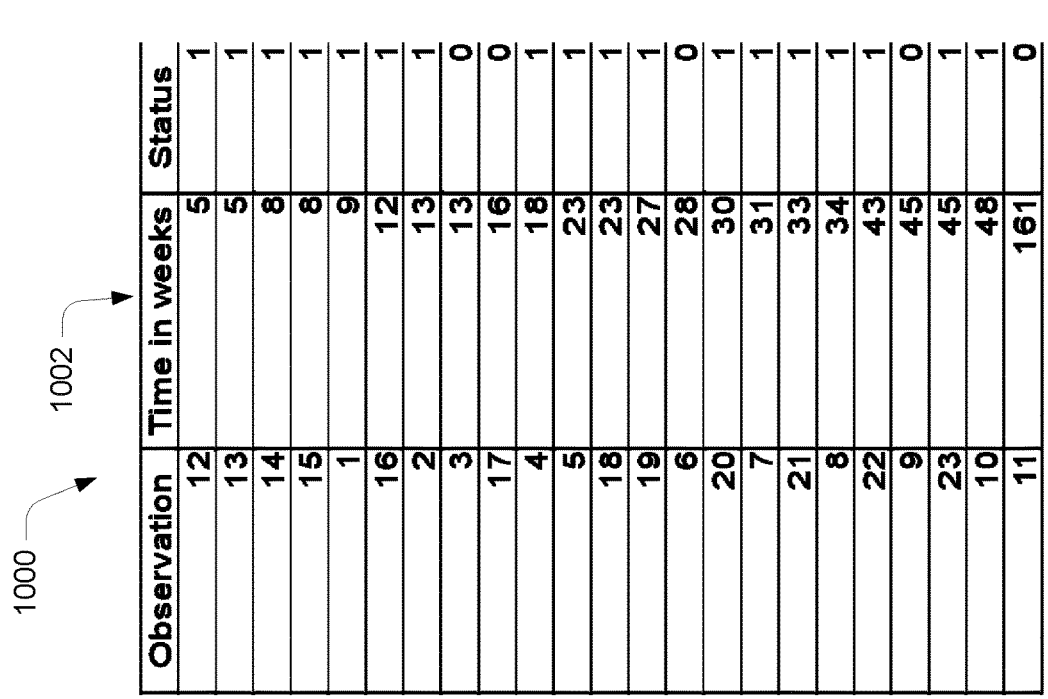
FIG. 10 illustrates an exemplary dataset for determination of a survival probability and a hazard probability for the benefit surrender prediction, according to an example embodiment of the present disclosure.

The survival probability 214 and the hazard probability 218 may be determined from analyzing the benefit information from the benefit surrender database 206. The EDA may analyze the benefit information from the benefit surrender database 206 to determine the survival probability 214 and the hazard probability 218 for various time brackets such as weeks. The benefit information may include factors such as a time "t", which may be a time at which observation may be taken as mentioned in the Equation 1 and the Equation 2. Further, the factors may include a number "d", which may be a number of surrendered or dead or lapsed benefits such as the benefit 204 at the given time "t". Furthermore, the factors may further include a number "n", which may be a number of the benefit users on whom benefit information may be available for the given time "t". Hence, "n" may denote the number of benefit users who may be at risk of surrendering the benefit 204 at the time "t". FIG. 10 illustrates an exemplary dataset for determination of the survival probability 214 and the hazard probability 218. The EDA may determine the hazard probability 218 for a time duration "t" by diving a value of "d" for that time interval "t" with a value of "n" for that time interval "t". In an example embodiment, the EDA may determine the hazard probability 218 as defined by the following equation:

$$h(t) = \frac{d_t}{n_t} \qquad \text{Equation 3}$$

wherein, h(t)=the hazard probability 218 for time "t" as determined by the EDA;

$d_t$=number of surrendered or dead or lapsed benefits such as the benefit 204 at the given time "t"; and $n_t$=a number of benefit users who may be at risk of surrendering the benefit 204 at the time "t".

Further, the EDA may determine the survival probability 214 for the time "t" as defined by the following equation:

$$S(t) = 1 - h(t) \qquad \text{Equation 4}$$

wherein,

S(t)=the survival probability 214 for time "t" as determined by the EDA; and

H(t)=the hazard probability 218 for time "t" as determined by the EDA;

The survival probability of the benefit and the hazard probability of the benefit may be associated with the benefit user data to generate benefit assessment data 222. The benefit assessment data 222 may include, for example, details such as benefit users with the survival probability 214 greater than hazard probability 218 and benefit users with the survival probability 214 lesser than hazard probability 218. The benefit assessment data 222 may facilitate the identification and categorization of the benefit users according to the survival probability 214 and the hazard probability 218.

The modeler 150 may implement a neural network-based deep learning survival model 224 (referred to as the survival model 224 hereinafter) to map the benefit assessment data with the plurality of benefit attributes to create a benefit surrender prediction model 226. The survival model 224 may be a deep learning N-Net survival model. The benefit surrender prediction model 226 may include a surrender probability 228. The surrender probability may be indicative of a predicted time duration 230 when the benefit may be surrendered. The modeler 150 may map the survival probability 214 of the benefit with the hazard probability 218 of the benefit to determine the surrender probability 228 and the predicted time duration 230. The surrender probability 228 for a time interval "$t_2$" may be a product of the survival probability 214 for a time interval "t", and the hazard probability 218 for the time interval "$t_2$", wherein the time interval "$t_2$" may be a successive time interval to the time interval "t". In an example embodiment, the surrender probability 228 for the second time duration 220 may be a product of the survival probability 214 for the first time duration 216 and the hazard probability 218 for the second time duration 220. The surrender probability 228 for any given time interval may be determined by multiplying the survival probability 214 from a preceding time interval with the hazard probability 218 of the given time interval. Therefore, for a given time interval the benefit surrender prediction model 226 may determine the surrender probability 228 of the benefit 204. Additionally, the time interval associated with the surrender probability 228 above a threshold value may be determined as the predicted time duration 230. The predicted time duration 230 may be a time interval where the surrender probability 228 for the benefit 204 may be highest. In an example embodiment, the threshold value of the surrender probability 228 may be pre-defined by a user of the system 110 or may be automatically configurable.

The surrender probability may be mapped with the plurality of benefit attributes and the benefit user data to determine a surrender pattern 240 of the benefit user 212. In an example embodiment, the modeler 150 may map the surrender probability of the benefit with the attribute index 238 for each user to determine the surrender pattern 240 for the benefit user. The surrender pattern 240 may indicate which categories of benefit users are most likely to surrender the benefit 204 at the predicted time duration 230. Accordingly, appropriate benefit user retention strategies may be implemented based on the surrender pattern 240.

The modeler 150 may generate a benefit surrender result 234 comprising the surrender pattern 240 of the benefit user 212, the surrender probability 228, and the predicted time duration 230 for the benefit 204. A remedial action 236 may be performed in response to the benefit prediction requirement 202, based on the benefit surrender result 234. For example, the remedial action 236 may include a determination of a benefit user retention strategy based on the benefit surrender result 234. In an example embodiment, the system 110 may require input from a user of the system to validate and implement the remedial action 236. In another embodiment, the system 110 may automatically validate and implement the remedial action 236.

Figure 3:
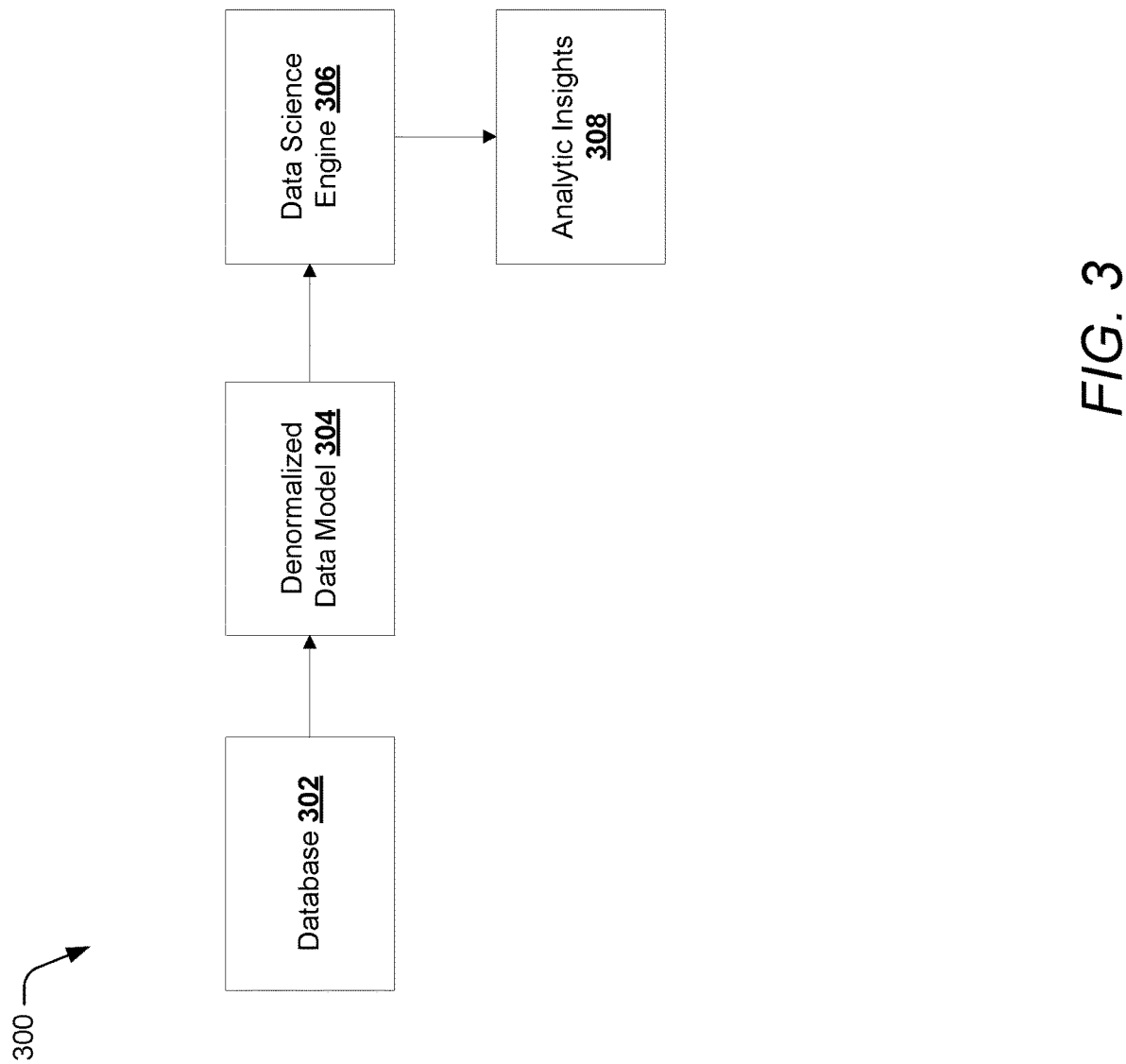
FIG. 3 illustrates a flow diagram of a prediction model for the benefit surrender prediction, according to an example embodiment of the present disclosure.

FIG. 3 illustrates a flow diagram 300 of a prediction model for the benefit surrender prediction, according to an example embodiment of the present disclosure. In an exemplary embodiment, steps illustrated by the way of description for the flow diagram 300 may be deployed by the system 110 for the benefit surrender prediction. Therefore, any of the steps illustrated herein may be implemented by a component of the system 110. The prediction model may include the artificial intelligence component 210 and the survival model 224. The flow diagram 300 illustrates a database 302, a denormalized data model 304, a data science engine 306, and an analytical insights component 308. The database 302 may be the benefit surrender database 206 described above by way of the description for FIG. 2. The database 302 may include any data related to a client of an organization associated with providing the benefit 204. Further, the database 302 may include various internal and external indicators such as client demographics, geographical details, benefit details, historical transactions, and banking details associated with a client, and the like. The artificial intelligence component 210 may process the data present in the database 302 to create the denormalized data model 304. The artificial intelligence component 210 may implement various tools and processes (described further by way of the description for FIGS. 5A and 5B) to process the data from the database 302. The denormalized data model 304 may include data from the database 302 that has been treated for the presence of any outlier data, missing values, and the like. Further, the data science engine 306 may implement the survival model 224 on the denormalized data model 304. The data science engine 306 may determine various parameters such as the survival probability 214, the first time duration 216, the hazard probability 218, and the second time duration 220 from the denormalized data model 304. The data science engine 306 may create the benefit surrender prediction model 226 including the surrender probability 228 and the predicted time duration 230 associated with the benefit as described by way of the description for FIG. 2. The analytical insights component 308 may generate a visualization of the benefit surrender prediction result 234 for a user of the system 110. In an example embodiment, the analytical insights component 308 may generate and display the surrender pattern 240 and the remedial action 236 to a user of the system 110.

Figure 4:
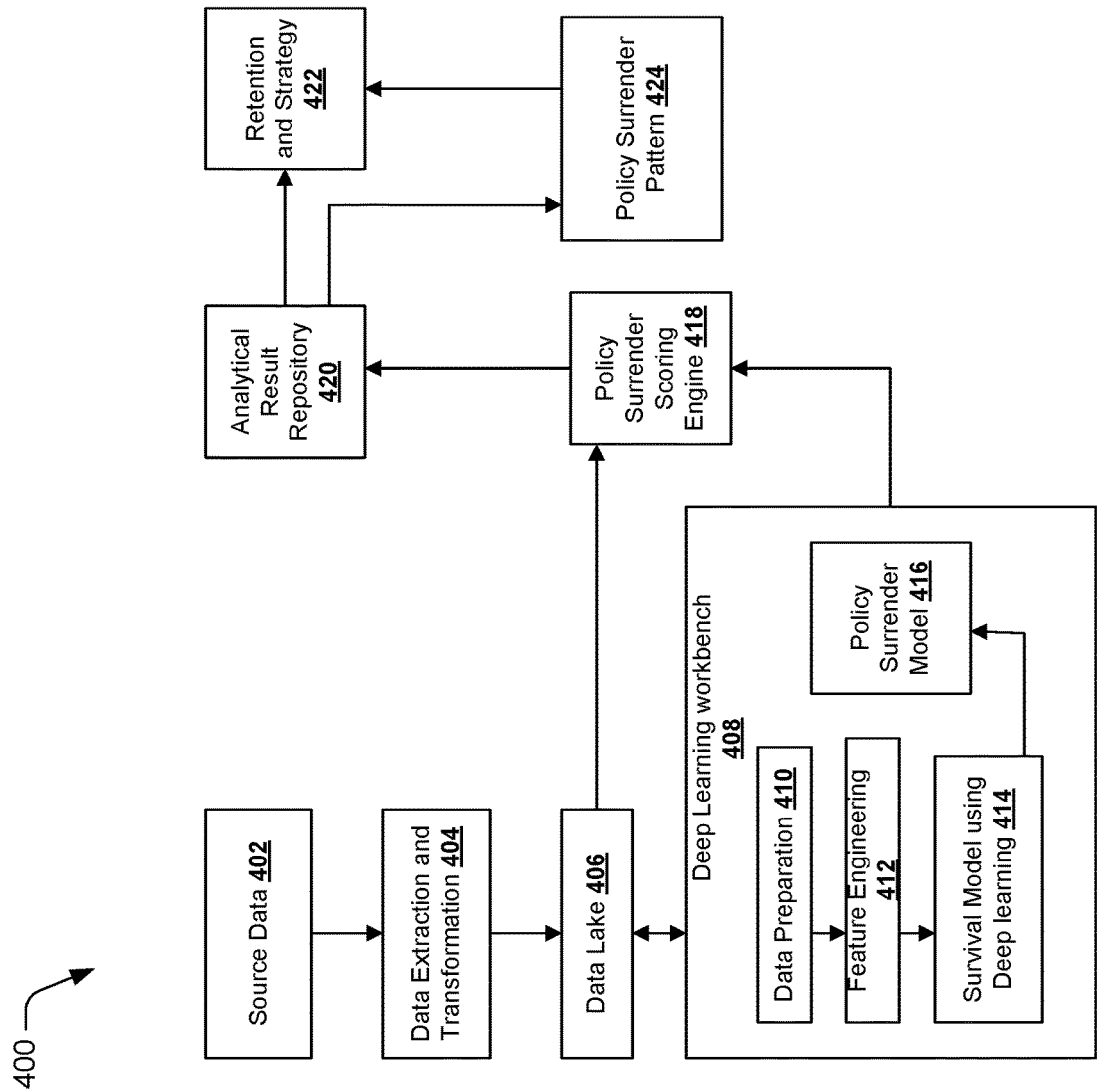
FIG. 4 illustrates a technical flow diagram of the prediction model for the benefit surrender prediction, according to an example embodiment of the present disclosure.

FIG. 4 illustrates a technical flow diagram 400 of the prediction model for the benefit surrender prediction, according to an example embodiment of the present disclosure. In an exemplary embodiment, steps illustrated by the way of description for the flow diagram 400 may be deployed by the system 110 for the benefit surrender prediction. Therefore, any of the steps illustrated herein may be implemented by a component of the system 110. The flow diagram 400 illustrates a source data 402. The source data 402 may be the database 302 including various internal and external indicators such as client demographics, geographical details, benefit details, historical transactions and banking details associated with a client, and the like. The flow diagram 400 includes a data extraction and transformation 404, wherein various data cleaning and transformation techniques may be implemented on the source data 402. The data cleaning and transformation techniques have been described further by way of the description for FIGS. 5A and 5B. The system 110 may create a data lake 406 from the source data 402 by implementing the data extraction and transformation 404.

Further, the flow diagram 400 may include a Deep Learning (DL) workbench 408. The DL workbench 408 may include a data preparation 410, a feature engineering component 412, a survival model 414, and a benefit surrender model 416. The DL workbench 408 may be created using various utilities such as programming languages R®, Python®, and the like. The data preparation 410 may include the implementation of various exploratory data analysis (EDA) techniques on the data from the data lake 406. The feature engineering component 412 may identify a set of features to be used by the prediction model for the benefit surrender prediction. The feature engineering component 412 may implement the artificial intelligence component 210 to identify the set of features. In an example embodiment, benefit attributes 208 and the categories from the benefit surrender database 206 may be the features identified by the feature engineering component 412. Table 1 presented herein lists some of the exemplary features (the benefit attributes 208 and the categories from the benefit surrender database 206) identified by the feature engineering component 412 for benefit surrender prediction.

TABLE 1

| Benefit Surrender Database Categories | Description |
| --- | --- |
| PRODUCT_CATEGORY_CODE | Code of the product category owned by the client |
| PRODUCT_CATEGORY | Category of the product ex annuity, term plan, and the like |
| PRODUCT_TYPE | Type of the product |
| CONTRACT_STATUS_CODE | The code for the status of the contract, ex A(active), C(surrender) |
| CONTRACT_STATUS_DESC | Description of the contract status |
| SURRENDERED_FLAG | 1: surrender, 0: active |
| STATE_CODE | Code for the state |
| STATE_NAME | Name of the state |
| QUALIFIED_TYPE_CODE | Code for the type of annuity |
| QUALIFIED_TYPE_DESC | Description of the type of annuity |
| QUALIFIED_FLAG | Yes or no to take the annuity product |
| EXCHANGE_DESC | Whether the benefit could be exchanged, transferred, rollover, and the like |
| INITIAL_PREM_BUCKET | Bucket of the initial premium amount |
| CONTRACT_NUMBER | Contract number |
| CONTRACT_EFFECTIVE_DATE | Contract start date |
| CONTRACT_EFFECTIVE_DATE_YEAR | Contract start year |
| CONTRACT_MATURITY_DATE | Contract maturity date |
| CONTRACT_MATURITY_DATE_YEAR | Contract maturity year |
| CLIENT_ID | Unique id of the client |
| CLIENT_DOB | Client date of birth |
| CLIENT_AGE | Client age |
| CONTRACTS_OWNED_BY_CLIENT | Total number of contracts(such as insurance policies) owned by the client |
| TRANSACTION_COUNT | Total number of transactions done by client till date(withdrawal, deposit premium amount, and the like) |
| LAST_TRANSACTION_YEAR | Latest transaction year |
| INITIAL_PREMIUM | Initial premium |
| ADDITIONAL_PAYMENT_COUNT | Number of times the client has made an additional payment |
| ADDITIONAL_PAYMENT_AMOUNT | The total amount of additional payment |
| WITHDRAWAL_COUNT | Number of times the client has withdrawn |
| WITHDRAWAL_AMOUNT | The total amount of withdrawal |
| LAST_TXN_DATE | Latest transaction date |
| FIRST_WITHDRAWAL_DATE | First withdrawal date |
| LAST_WITHDRAWAL_DATE | Latest withdrawal date |
| Age_By_Eff_Date | Age by the effective date |
| Age_By_Mat_Date | Age by the maturity date |
| Age_By_today | Age by today |
| FIRST_WITHDR_MON | The total number of months from the benefit effective date to the first withdrawal date |

TABLE 1-continued

| Benefit Surrender Database Categories | Description |
|---|---|
| SURRENDER_DATE | Benefit surrender date |
| AVG_WITHDR_MON | The average of the number of months to the withdrawal |
| monthstoevent | It's a derived variable (benefit surrender date - benefit issue date) |

The feature engineering component 412 may identify the benefit attributes 208 from the data lake 406. The feature engineering component 412 may map the benefit attributes 208 with the benefit user data to create the benefit surrender database 206. The DL workbench 408 may further include the implementation of the survival model 414 on the benefit surrender database 206. The survival model 414 may be the survival model 224. In an example, embodiment, the survival model 414 may be a deep learning N-net survival model (explained further by way of the description for FIGS. 7-9). The survival model 414 may determine the survival probability 214, the first time duration 216, the hazard probability 218, and the second time duration 220 from the benefit surrender database 206. The survival model 414 may generate the benefit assessment data 222 based on associating the survival probability 214 hazard probability of the benefit 204 with benefit user data. The benefit assessment data 222 may be used by the survival model 414 to create the benefit surrender model 416. The benefit surrender model 416 may be the benefit surrender prediction model 226 described above by way of the description for the FIG. 2. Additionally, the feature engineering component 412 may create the attribute index 238 by mapping the benefit attributes with the benefit user data. The attribute index 238 may include values for the benefit attributes 208 that may be associated with a particular user.

Further, the flow diagram 400 may include a benefit surrender scoring engine 418. The benefit surrender scoring engine 418 may require inputs from the data lake 406 and the DL workbench 408 to generate a value for the surrender probability 228, a value for the predicted time duration 230, and a value for the surrender pattern 240 based on the benefit surrender model 416. The benefit surrender model 416 may include a prediction framework trained from historical data to generate the aforementioned values (described further by way of the description for the FIGS. 5A and 5B). The benefit surrender scoring engine 418 may store the predicted values for the surrender probability 228, the predicted time duration 230, and the surrender pattern 240 in an analytical result repository 420. The analytical result repository 420 may be used to generate various visualizations for the benefit surrender result 234. The analytical result repository 420 may map the surrender probability 228 of the benefit with the attribute index 238 for each benefit user 212 to determine a benefit surrender pattern 424 for the benefit user 212. The benefit surrender pattern 424 may be the surrender pattern 240. The analytical result repository 420 may also facilitate the generation of retention strategy 422 based on the benefit surrender pattern 424 and the benefit surrender result 234.

Figure 5A:
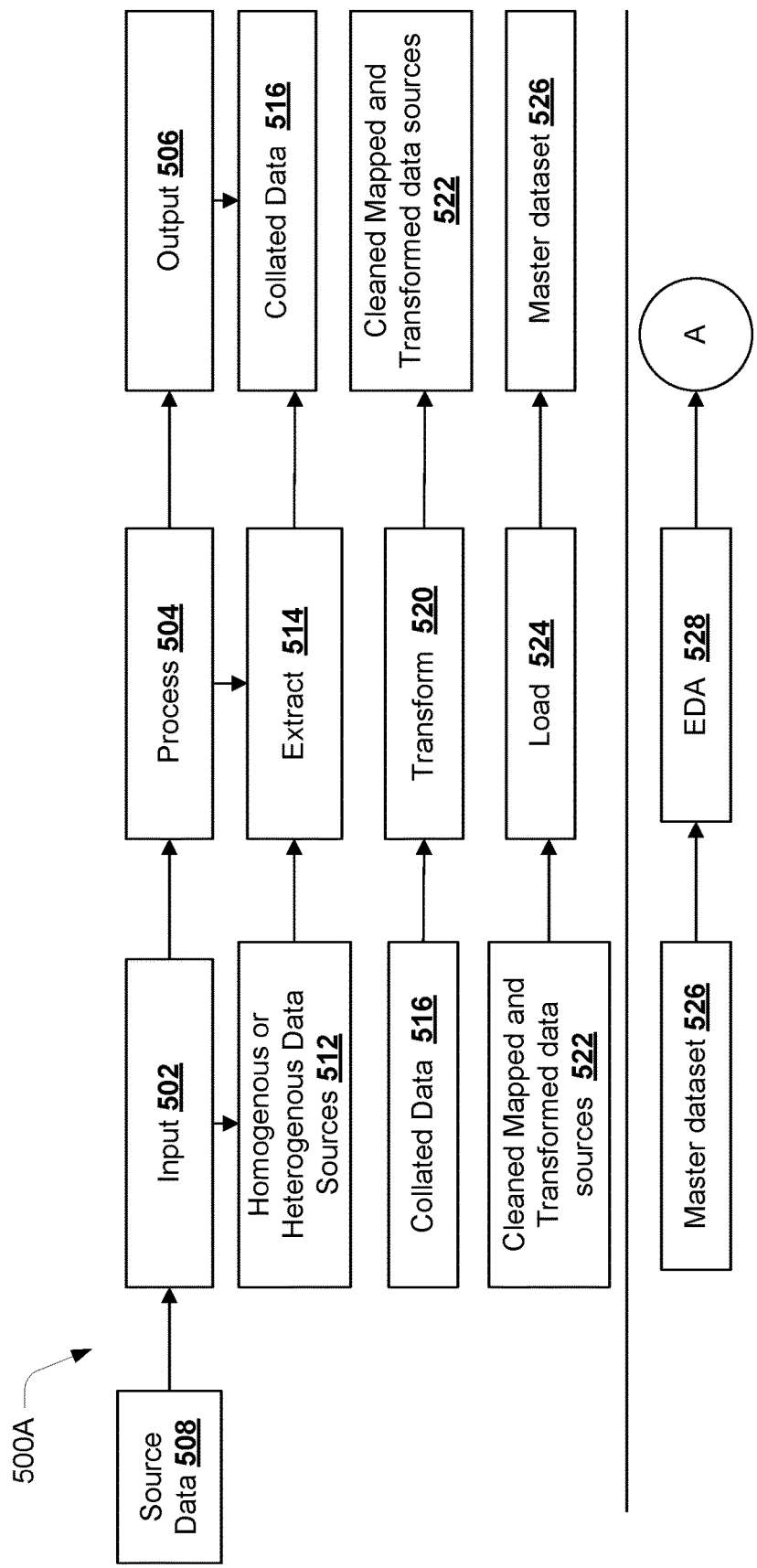
FIGS. 5A and 5B illustrate an architectural flow diagram of modeling data for the creation of a deep learning model for the benefit surrender prediction, according to an example embodiment of the present disclosure.
Figure 5B:
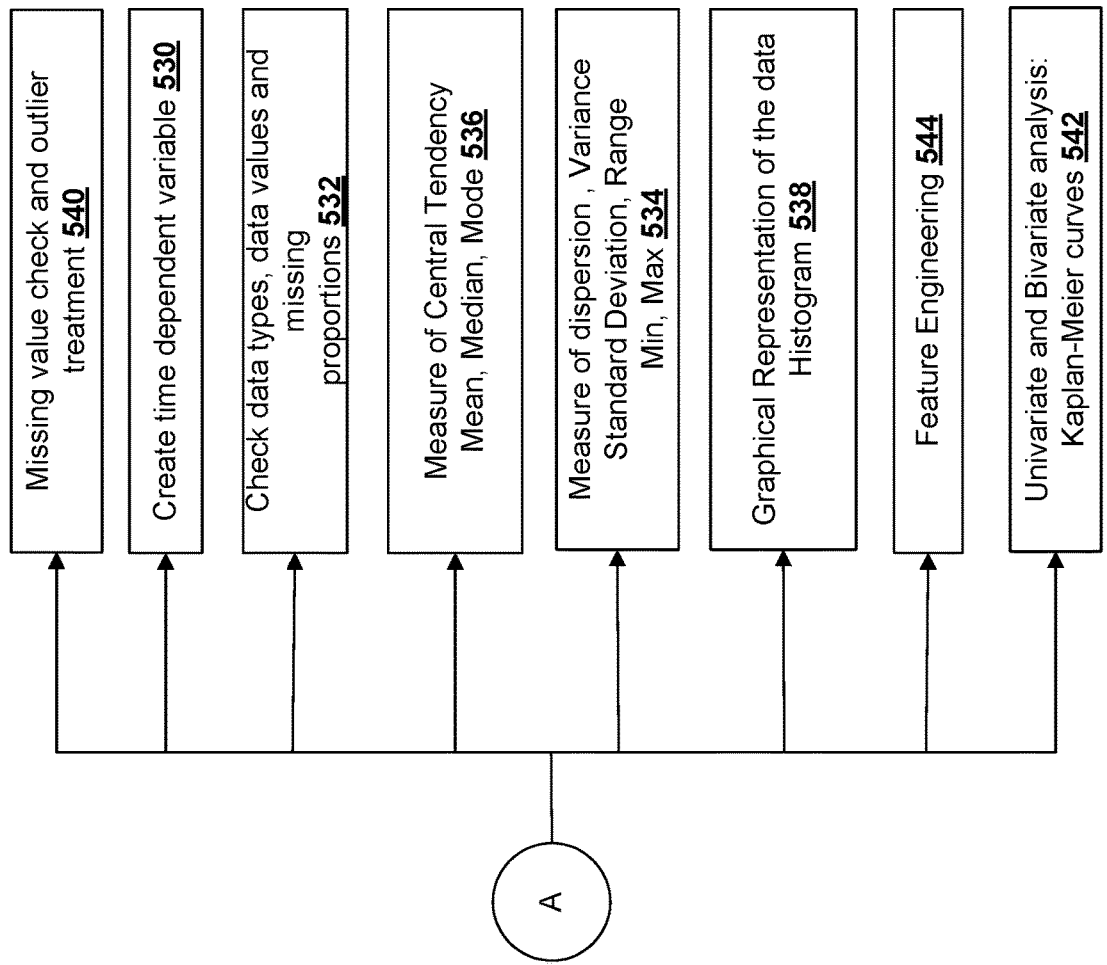

FIGS. 5A and 5B illustrate an architectural flow diagram 500A and an architectural flow diagram 500B of modeling data for the creation of a deep learning model for the benefit surrender prediction, according to an example embodiment of the present disclosure. In an example embodiment, the deep learning model may be the survival model 224. Any of the components of the system 110 may be used for the description of the architectural flow diagram 500A and the architectural flow diagram 500B. For the sake of brevity and technical clarity the architectural flow diagram 500A and the architectural flow diagram, 500B would be described together.

In an example embodiment, the survival model 224 may include a source data 508. The source data 508 may be obtained from the data sources mentioned by way of the description for FIG. 1. As mentioned above, by way of the description for FIGS. 1-4, the system 110 may implement the artificial intelligence component 210 to process the source data 508. The source data 508 may be processed by the data extraction and transformation 404. In an example embodiment, the data extraction and transformation 404 may be implemented on the source data 508 to create the denormalized data model 304. The system 110 may include an input component 502, a processing component 504, and an output component 506. The processing component 504 may implement an Extract, Transform, Load (ETL) procedure. It must be appreciated by a person skilled in the art that ETL may be a set of three database functions that may be used in combination to form a single one tool for pulling data out of one source database and place it into a target database.

The input component 502 may receive data from a set of data sources 512. The set of data sources 512 may include various heterogeneous data sources such as those with high variability of data categories and data formats. Additionally, a set of data sources 512 may include various homogenous data sources such as those comprising a similar type of data for example client details. The set of data sources 512 may be the source databases for the ETL procedure. The processing component 504 may implement an extraction operation 514 to collect the data from the set of data sources 512. The output component 506 may create a collated data set 516 from the results of the extraction operation 514. The collated data set 516 may include data extracted from the set of data sources 512. The extraction operation 514 may read the data from the set of data sources 512.

The input component 502 may obtain the collated data set 516 as an input from the output component 506 and send the collated data set 516 to the processing component 504. The processing component 504 may implement a transformation operation 520 on the collated data set 516. The transformation operation 520 may be a part of the ETL procedure. The transformation operation 520 may convert the extracted data from the extraction operation 514 from a previous format into a compatible format so that it may be placed into another database. The transformation operation 520 may be implemented using various predefined rules or pre-defined lookup tables or by combining the one form of data with other forms of data. In an example embodiment, the pre-defined rules or the pre-defined lookup tables may be stored into the system 110. The predefined rules or the pre-defined lookup tables may be updated by a user or the system 110 may be configurable to automatically update the predefined rules or the pre-defined lookup tables based on the collated data set 516. The output component 506 may create a clean dataset 522 including cleaned mapped and transformed dataset. Further, the input component 502 may obtain the clean dataset 522 as input from the output component 506 and send the clean dataset 522 to the processing component 504. The processing component 504 may implement a loading operation 524 on the clean dataset 522. The loading operation 524 may be a part of the ETL procedure. The loading operation 524 may store the clean dataset 522 in the target database. The target database may include a master dataset 526. The master dataset 526 may be a result of the ETL procedure. The master dataset 526 may include the data from the set of data sources 512 that may have been synchronized into a single format.

The input component 502 may obtain the master dataset 526 from the output component 506 and send the master dataset 526 to an EDA implementer 528. The EDA implementer 528 may implement various EDA techniques on the master dataset 526. The EDA may refer to a process of performing various data investigations to discover various patterns, underlying data structure, and data models therefrom. Additionally, the EDA implementer 528 may be implemented for achieving various purposes such as to detect outliers and anomalies, maximize insights gained from a data set, extract important variables therefrom, test underlying assumptions, develop parsimonious models, determine optimal factor settings, and the like. The EDA implementer 528 may perform a check 540 to check for missing values in the master dataset 526 and detect any outliers therein.

Further, the EDA implementer 528 may create various variables such as a time-dependent variable 530 that may be associated with the benefit attributes 208. For example, the EDA may create time-dependent variables for the benefit attributes 208 presented in Table 1. The time-dependent variable 530 may facilitate the benefit surrender prediction for various time brackets such as a year, a month, a quarter, and the like. Further, as illustrated in the FIG. 5B, the EDA implementer 528 may perform a check 532 to check data types from the master dataset 526. The check 532 may further check data types, data values, and missing proportions of data associated with the data types from the master dataset 526. The EDA implementer 528 may perform a check 536 to check for measures of central tendency such as a mean, a median, a mode, and the like. The EDA implementer 528 may perform a check 534 to check a measure of dispersion such as a variance, a standard deviation, a statistical range, a maximum, a minimum, and the like. The EDA implementer 528 may execute a generation 538. The generation 538 may include generation of graphical representation such as histograms for the master dataset 526.

Additionally, the EDA implementer 528 may implement a feature engineering 544 on the master dataset 526 and on the results generated from the generation of the time-dependent variable 530, the check 532, the check 534, the check 536, the generation 538, and the check 540. Further, the EDA implementer 528 may implement an analysis 542. The analysis 542 may include various univariate and bivariate analysis amongst various variables present in the master data set 526. The EDA implementer 528 may implement techniques such as Kaplan-Meier curves, histograms, scatter plots, box plots, various statistical tools and the like to create the time-dependent variable 530 and to perform the check 532, the check 534, the check 536, the generation 538, the check 540, and the analysis 542. It must be appreciated that various other EDA techniques may be implemented herein without diverting from the scope of the disclosure.

Figure 6:
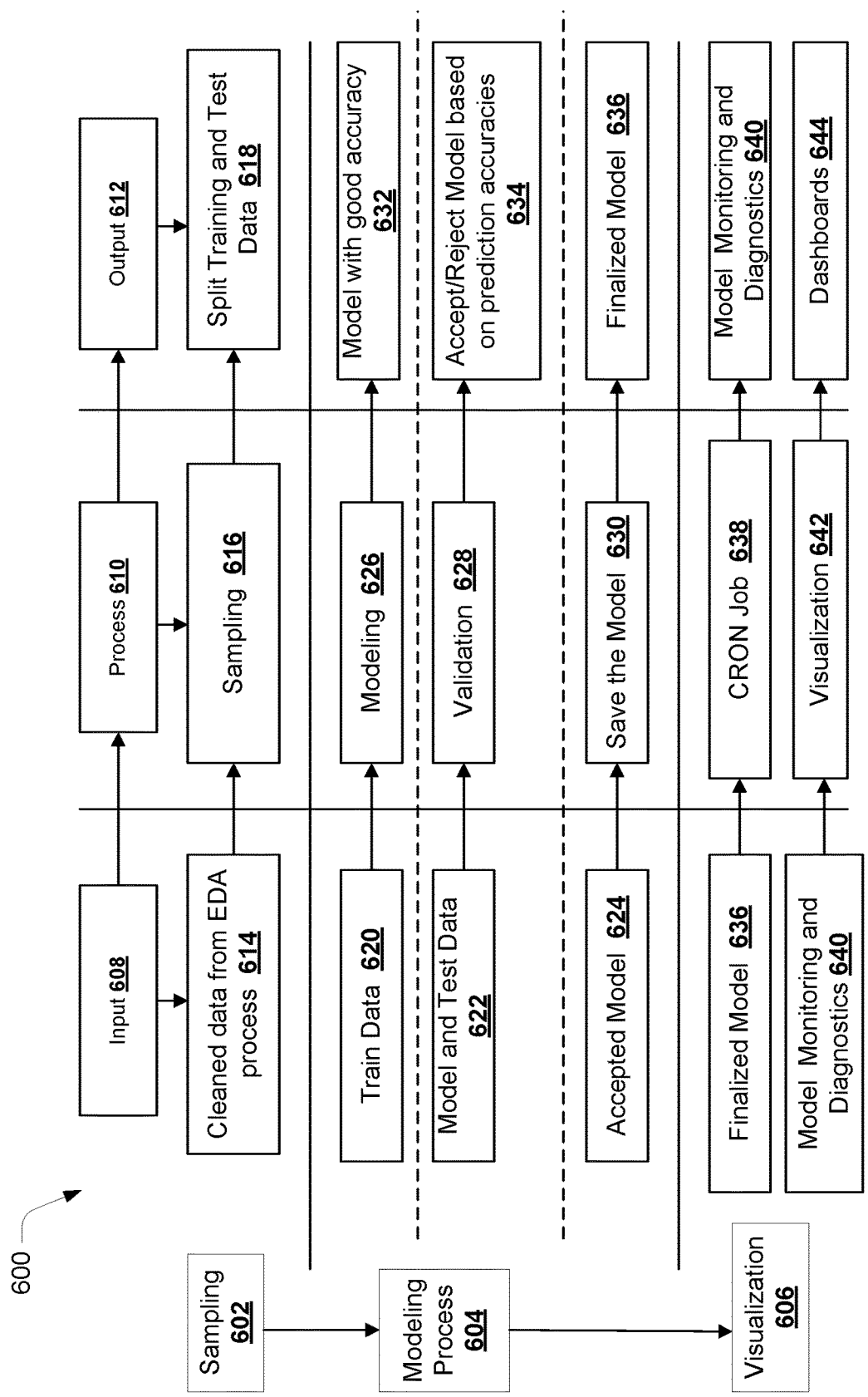
FIG. 6 illustrates an architectural flow diagram for the creation of the deep learning model for the benefit surrender prediction, according to an example embodiment of the present disclosure.

FIG. 6 illustrates an architectural flow diagram 600 for the creation of the survival model 224 for the benefit surrender prediction, according to an example embodiment of the present disclosure. In an example embodiment, implementation of the survival model 224 may include a sampling process 602, a modeling process 604, and a visualization process 606. The sampling process 602 may include a selection of a subset of the master dataset 526 to estimate various characteristics of the whole data. Further, the survival model 224 may include an input component 608, a processing component 610, and an output component 612. The input component 608 may receive a dataset 614 as input from the output component 506. The dataset 614 may be the master dataset 526 after the implementation of EDA. The processing component 610 may obtain the dataset 614 and implement a sampling process on the same. The sampling process may be an active process of gathering observations intent on estimating a variable such as a benefit attribute 208 from the dataset 614. The output component 612 may obtain data samples 616 created by the sampling process and implement a splitting 618. The splitting 618 may create a test data set and a training dataset from the data samples 616. The training dataset may be used by the system 110 for training and fitting the survival model 224 to the parameters from the benefit assessment data 222. The test dataset may be used by the system 110 to assess the performance of survival model 224. The training dataset and the test dataset may be extracted from the data samples.

The modeling process 604 may include a data training 620 for training the training dataset to the parameters from the benefit assessment data 222. The data training 620 may be done by the input component 608. The processing component 610 may implement a modeling process 626. The modeling process 626 may fit the training dataset to the parameters from the benefit assessment data 222. In an example embodiment, the modeling process 626 may create multiple models, while fitting the training dataset to the parameters from the benefit assessment data 222. In an example embodiment, the models may be built using various AI-based libraries such as NumPy®, Pandas®, Matplotlib®, Scikit-learn®, and the like. The output component 612 may implement an identification 632 to identify the model with the highest prediction accuracy among the multiple models.

Further, the input component 608 may obtain the resulting model after the identification 632 at a block 622. The processing component 610 may implement a validation 628 to test the model identified by the identification 632. The validation 628 may be done using the test dataset identified above to access the performance of the model identified by the identification 632. The output component 612 may implement a check 634. The check 634 may include accepting or rejecting the model identified by the identification 632 based on the prediction accuracy. It must be appreciated that although the model may be selected by the identification 632 based on the prediction accuracy, it may be rejected by the check 634 if the prediction accuracy for the model may be less than a threshold prediction accuracy value. In an example embodiment, the threshold prediction accuracy value may be pre-defined by a user of the system 110 or configured automatically by the system 110.

The input component 608 may obtain an accepted model 624 from the output component 612. The accepted model 624 may be the model identified by the identification 632 and accepted by the check 634. The processing component 610 may implement a storing operation 630, wherein the accepted model 624 may be stored into the system 110. The output component 612 may identify the accepted model 624 as a finalized model 636. The finalized model 636 may be the survival model 224 used for benefit surrender prediction by the system 110.

The visualization process 606 may include any technique for creating images, diagrams to communicate with a user of the system 110. The visualization process 606 may include various techniques for visual imagery to display the benefit surrender result 234, the remedial action 236, and the surrender pattern 240 to a user of the system 110. The input component 608 may obtain the finalized model 636. The processing component 610 may implement a CRON™ job 638 on the finalized model 636. The CRON™ job 638 may be a utility to automatically implement the finalized model 636 at a specified time on a specified date. The output component 612 may implement a diagnosis 640 on the finalized model 636. The diagnosis 640 may include monitoring the finalized model 636 and the CRON™ job 638 at stipulated time intervals. The time intervals may be stipulated by a user of the system 110. The results from the diagnosis 640 may be displayed to the user of the system 110. The input component 608 may obtain results from the diagnosis 640. The processing component 610 may create a visualization 642 from the results. The output component 612 may create a dashboard 644 from the visualization 642. The dashboard 644 may display the benefit surrender result 234, the remedial action 236, and the surrender pattern 240 to a user of the system 110.

Figure 7:
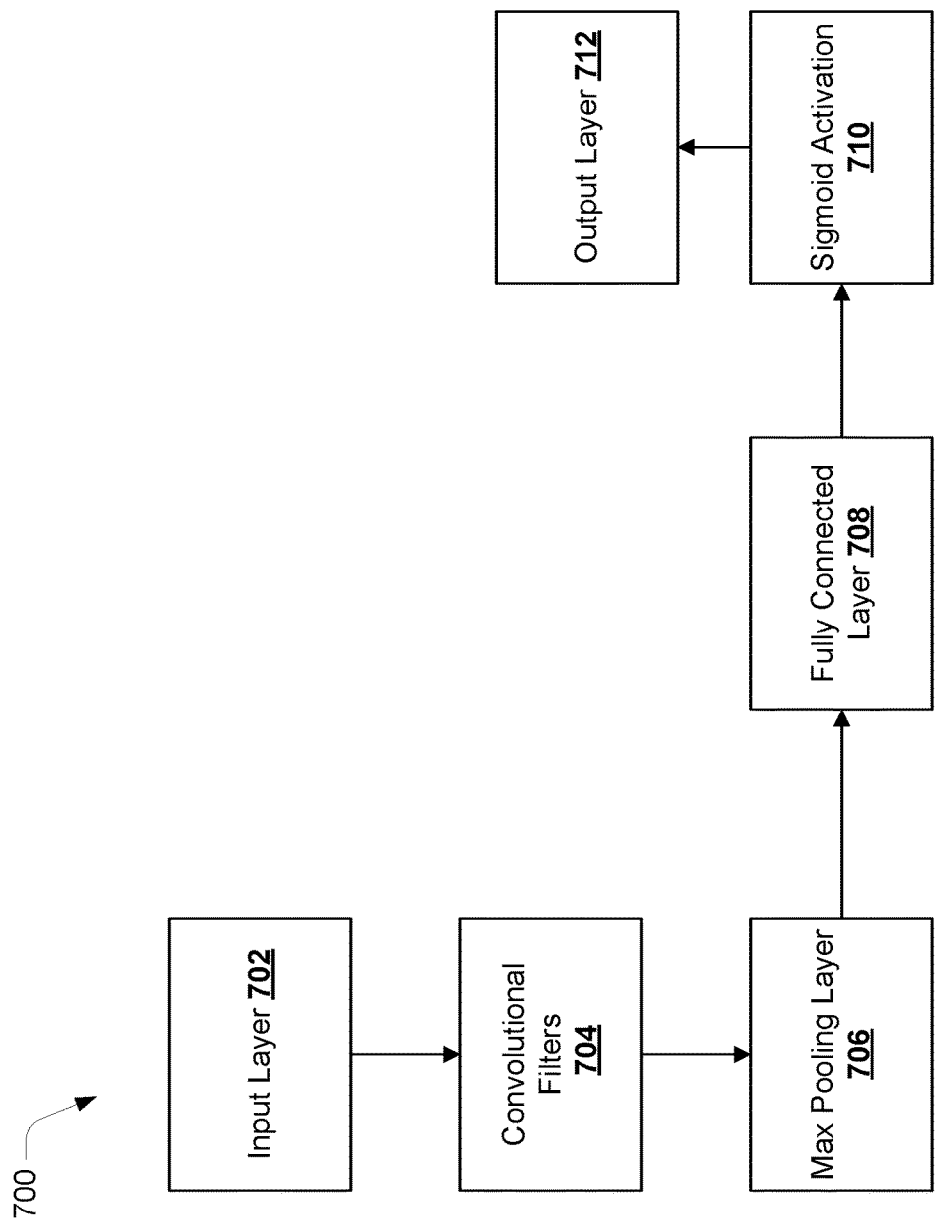
FIG. 7 illustrates a technical workflow diagram of the deep learning model for the benefit surrender prediction, according to an example embodiment of the present disclosure.

FIG. 7 illustrates a technical workflow diagram 700 of the survival model 224 for the benefit surrender prediction, according to an example embodiment of the present disclosure. As mentioned the finalized model 636 created as described by way the description for the FIGS. 5A-6 may be the survival model 224, the technical workflow diagram 700 would be described in terms of the finalized model 636. The finalized model 636 may be a deep learning N-Net survival model. The finalized model 636 may include the time-dependent variable 530 divided into a set of fixed intervals and for each interval, a conditional probability may be determined. The conditional surrender probability may be the surrender probability 228 of a time interval such as the predicted time duration 230 where an event such as surrender for the benefit 204 is likely to occur. The finalized model 636 may include a set of input layers 702, a set of convolutional filter layers 704, a set of max-pooling layers 706, a set of fully connected layers 708, a sigmoid activation layer 710, and an output layer 712.

The input layers 702 may include artificial input neurons. The input layers 702 may introduce the dataset 614 into the finalized model 636 for further processing by subsequent layers. The input layers 702 may be the first layers of the workflow for the artificial neural network such as the finalized model 636. In an example embodiment, the convolutional filter layers 704 may include twenty (20) convolutional filters. The convolutional filter layers 704 may create a feature map for the feature engineering component 412. The max-pooling layers 706 may include the implementation of a pooling operation that selects the maximum element from a region of the feature map covered by a filter from the convolutional filter layers 704. The max-pooling operation may be a sample-based discretization process, which may be used to downsize output from the convolutional filter layers 704 (described further by way of description for FIG. 8).

The max-pooling layers 706 may be densely connected to the fully connected layers 708. In an example embodiment, the finalized model 636 may include nineteen (19) hidden layers deep neural networks. The fully connected layers 708 may predict the conditional surrender probability for every time interval. There may be a neural network loss for every prediction that may be generated by each of the fully connected layers 708. The neural network loss may be defined by the following equation:

$$\frac{1}{2}\sum_{i=1}^{d}(1-h_j^i)^2 + \frac{1}{2}\sum_{i=d_j+1}^{r_j}(h_j^i)^2 \quad \text{Equation 5}$$

wherein, j=time interval for which the neural network loss may be determined
$h_j^i$=hazard probability for an individual "i" during time interval j
$r_j$=count of individuals that have not experienced surrendering or censoring of the benefit 204 before the beginning of the interval "j"
$d_j$=first time interval, where an individual may experience surrendering or censoring of the benefit 204. The overall neural network loss may be the sum of the losses for each time interval.

The sigmoid activation layer 710 may implement a sigmoid activation function on the output of the fully connected layers 708. The sigmoid activation layer 710 may provide an input to the output layer 712. The output layer 712 may include the output such as surrender probability 228. of the finalized model 636. The sigmoid activation function may convert the log odds from the output into a conditional probability of a benefit surviving a time interval. Therefore, the surrender probability 228 may vary with the following uptime. Hence, the system 110 may be used for estimation of the time of occurrence of the benefit surrender to enable timely actions for preventing a surrender of the benefits or providing an alternate benefit, and thus provide for client retention. The sigmoid activation function may generate the value of the surrender probability 228 between zero—one (0-1). The sigmoid activation function may be defined by the following equations:

$$z=\Sigma r_{i=1}^n(x_i w_i) \quad \text{Equation 6}$$

wherein,
n=number of events;
x=input from each event;
w=weight associated with each event as identified by the convolutional filter layers 704 and the max-pooling layers 706; and
z=a sum of all events;
The sigmoid activation function may be applied on the Equation 6 as follows:

$$S(x) = \frac{1}{1+e^{-z}} \quad \text{Equation 7}$$

wherein,
S(x)=Sigmoid activation function
e=Euler's number that may be a mathematical constant approximately equal to 2.71828 and is the base of the natural logarithm.

Equation 7 may generate an output "p", which may be a probability existing in a range of zero—one (0-1). The output "p" may be the surrender probability 228 existing in a range of zero—one (0-1).

Figure 8:
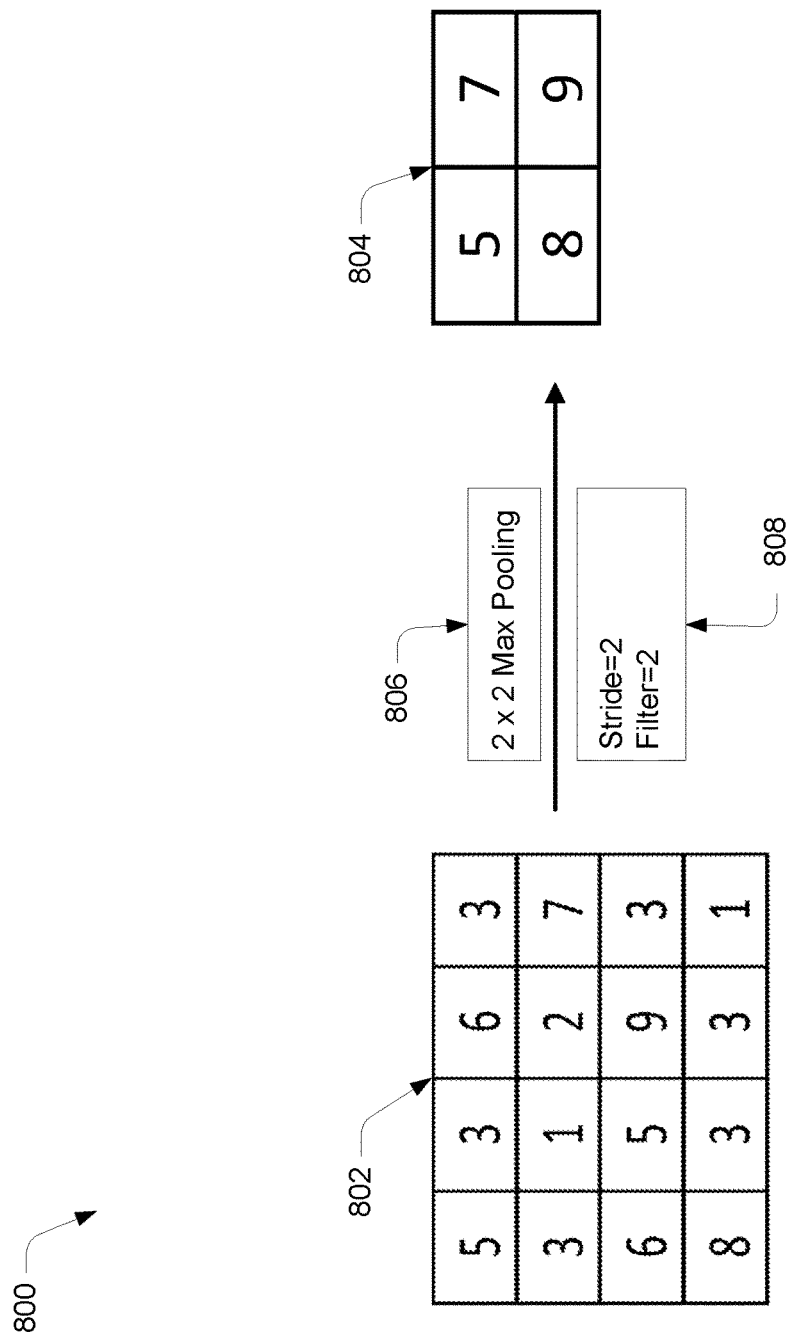
FIG. 8 illustrates a technical workflow diagram for a discretization process implemented by the deep learning model for the benefit surrender prediction, according to an example embodiment of the present disclosure.

FIG. 8 illustrates a technical workflow diagram 800 for a discretization process implemented by the finalized model 636 for the benefit surrender prediction, according to an example embodiment of the present disclosure. The workflow diagram 800 may include an output matrix 802. The output matrix 802 may be created by the convolutional filter layers 704. The max-pooling layers 706 may implement a max-pooling operation 806 on the output matrix 802. For example, as illustrated the max pooling operation 806 may include a two-by-two (2×2) max pooling, wherein a stride value may be equal to two and a filter value may be equal to two as illustrated by a block 808. The stride may control how the filter may convolve around the input dataset such as the dataset 614; hence stride may be a value by which a filter may shift. The max-pooling operation 806 may generate an output 804, wherein the size of the output matrix 802 may be reduced according to the stride value and the filter value.

Figure 9:
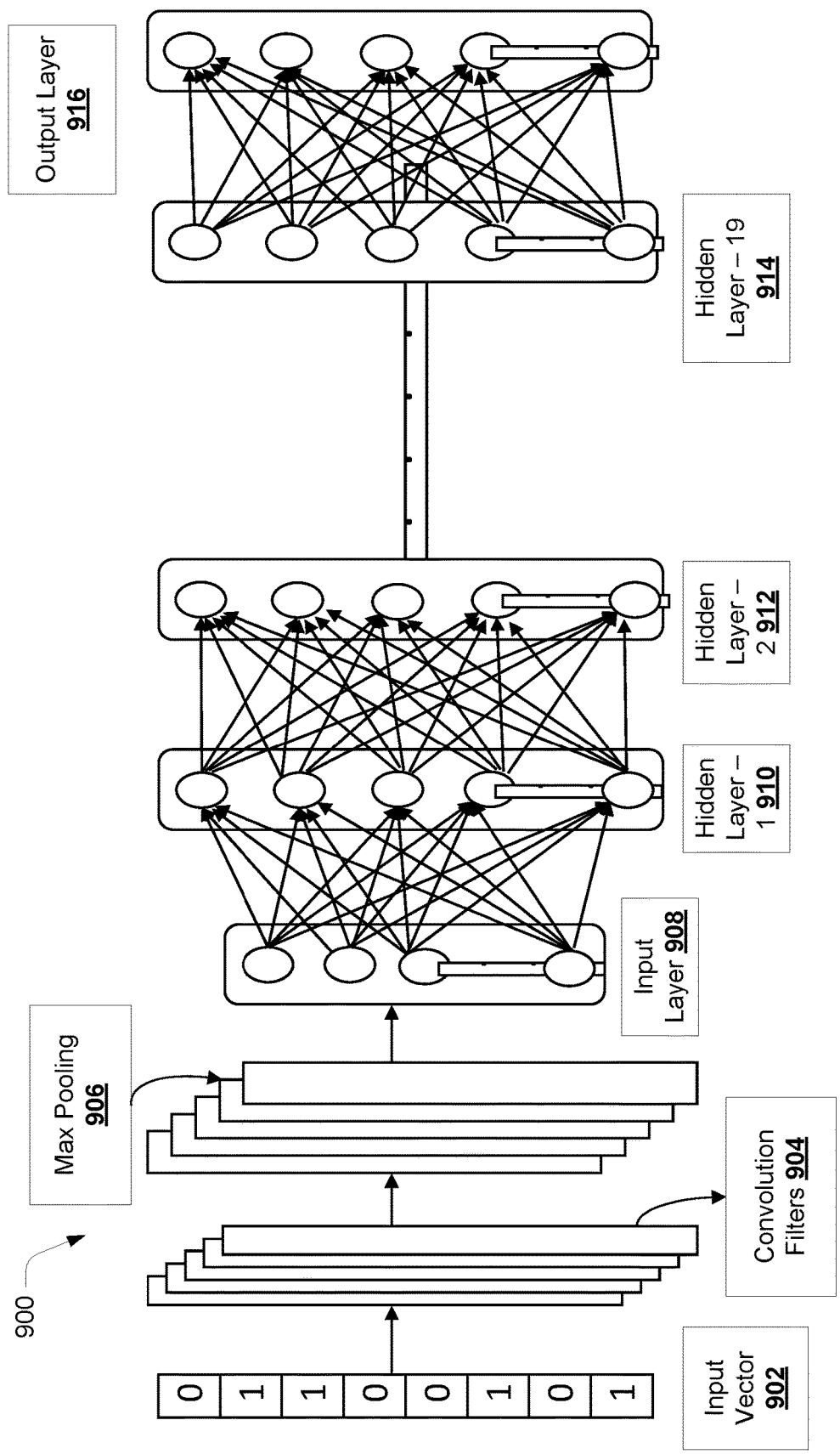
FIG. 9 illustrates a technical architecture diagram for the deep learning model for the benefit surrender prediction, according to an example embodiment of the present disclosure.

FIG. 9 illustrates a technical architecture diagram 900 for the finalized model 636 for the benefit surrender prediction, according to an example embodiment of the present disclosure. The finalized model 636 may include an input vector 902. The input vector 902 may be the same as the input layers 702. The finalized model 636 may further include a set of convolution filters 904 and a set of max-pooling layers 906. The convolution filters 904 may be similar to the convolutional filter layers 704. The max-pooling layers 906 may be similar to the max-pooling layers 706. Further, the finalized model 636 further various hidden layers such as an input layer 908, a first hidden layer 910, a second hidden layer 912, and a nineteenth ($19^{th}$) hidden layer 914. The input layer 908, the first hidden layer 910, the second hidden layer 912, and the nineteenth ($19^{th}$) hidden layer 914 may be various layers from the fully connected layers 708. Furthermore, the finalized model 636 may include an output layer 916, which may be similar to the sigmoid activation layer 710 and the output layer 712.

FIG. 10 illustrates an exemplary dataset 1000 for determination of the survival probability 214 and the hazard probability 218 for the benefit surrender prediction, according to an example embodiment of the present disclosure. The exemplary dataset 1000 may include a table representation 1002 and a table representation 1004. The table representation 1002 may be an exemplary representation of a portion of the benefit surrender database 206. The finalized model 636 may identify a time "t" as a benefit surrender time of an arbitrary benefit user from the dataset 614. Further, the dataset 614 may include a number "d", which may be a number of surrendered or dead or lapsed benefits at a given time "t". The dataset 614 may further include a number "n", which may be a number of the benefit users on whom benefit information may be available. Hence, "n" may denote the number of benefit users who may be at risk of surrendering the benefit 204. The table representation 1004 depicts an exemplary determination of the survival probability 214 denoted by S(t) and the hazard probability 218 denoted by H(t).

Figure 11:
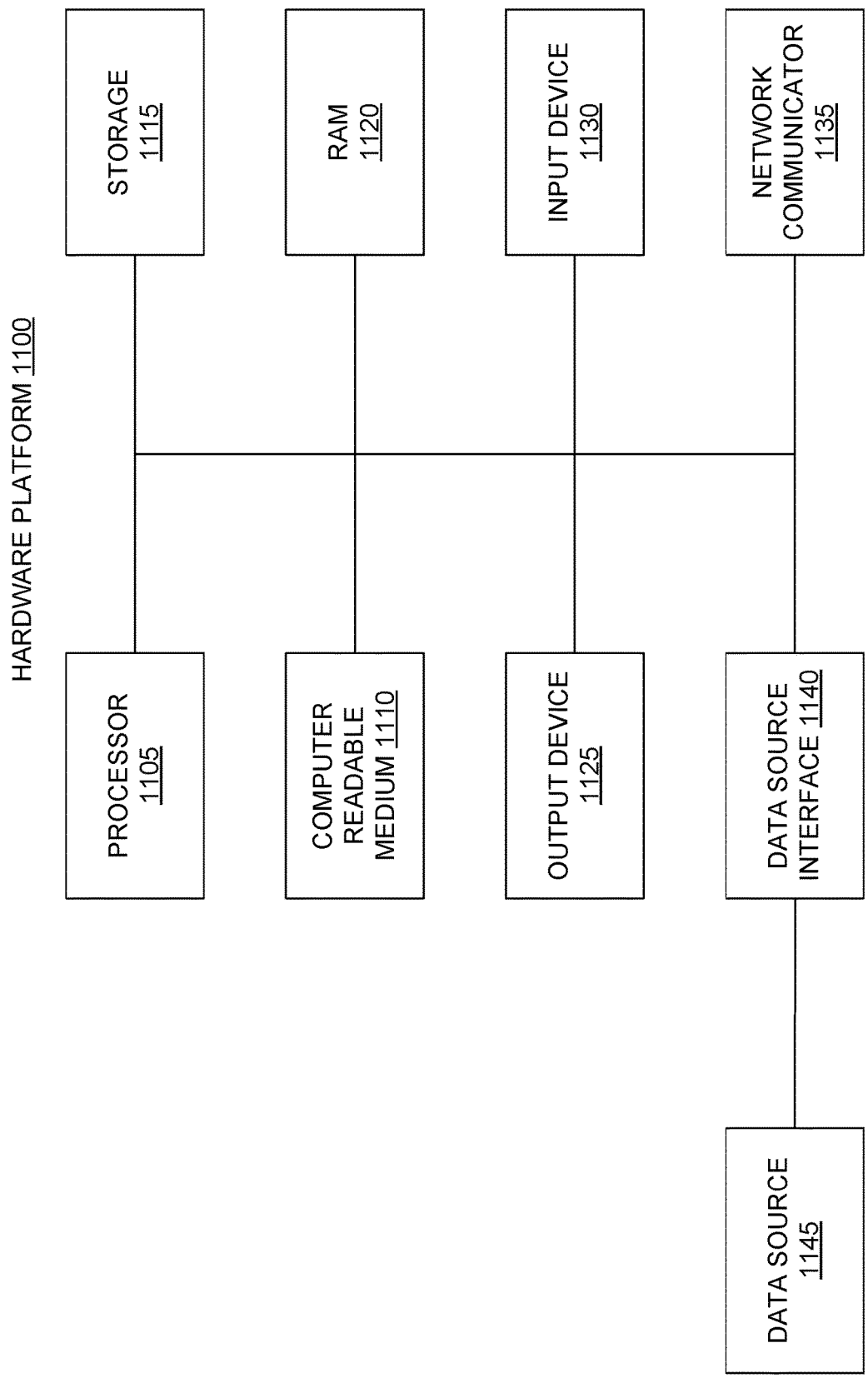
FIG. 11 illustrates a hardware platform for the implementation of the benefit surrender prediction system, according to an example embodiment of the present disclosure.

FIG. 11 illustrates a hardware platform 1100 for implementation of the system 110, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1100. The hardware platform 1100 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

The hardware platform 1100 may be a computer system 1100 that may be used with the examples described herein. The computer system 1100 may represent a computational platform that includes components that may be in a server or another computer system. The computer system 1100 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1100 may include a processor 1105 that executes software instructions or code stored on a non-transitory computer-readable storage medium 1110 to perform methods of the present disclosure. The software code includes, for example, instructions to gather data and documents and analyze documents. In an example, the data extractor 130, the data analyzer 140, and the modeler 150 may be software codes or components performing these steps.

The instructions on the computer-readable storage medium 1110 are read and stored the instructions in storage 1111 or in random access memory (RAM) 1120. The storage 1111 provides a large space for keeping static data where at least some instructions could be stored for later execution. The stored instructions may be further compiled to generate other representations of the instructions and dynamically stored in the RAM 1120. The processor 1105 reads instructions from the RAM 1120 and performs actions as instructed.

The computer system 1100 further includes an output device 1125 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1100 further includes input device 1130 to provide a user or another device with mechanisms for entering data and/or otherwise interact with the computer system 1100. The input device may include, for example, a keyboard, a keypad, a mouse, or a touchscreen. Each of these output devices 1125 and input devices 1130 could be joined by one or more additional peripherals. In an example, the output device 1125 may be used to display the results of the benefit prediction requirement 202.

A network communicator 1135 may be provided to connect the computer system 1100 to a network and in turn to other devices connected to the network including other clients, servers, data stores, and interfaces, for instance. A network communicator 1135 may include, for example, a network adapter such as a LAN adapter or a wireless adapter. The computer system 1100 includes a data source interface 1140 to access data source 1145. A data source is an information resource. As an example, a database of exceptions and rules may be a data source. Moreover, knowledge repositories and curated data may be other examples of data sources.

Figure 12A:
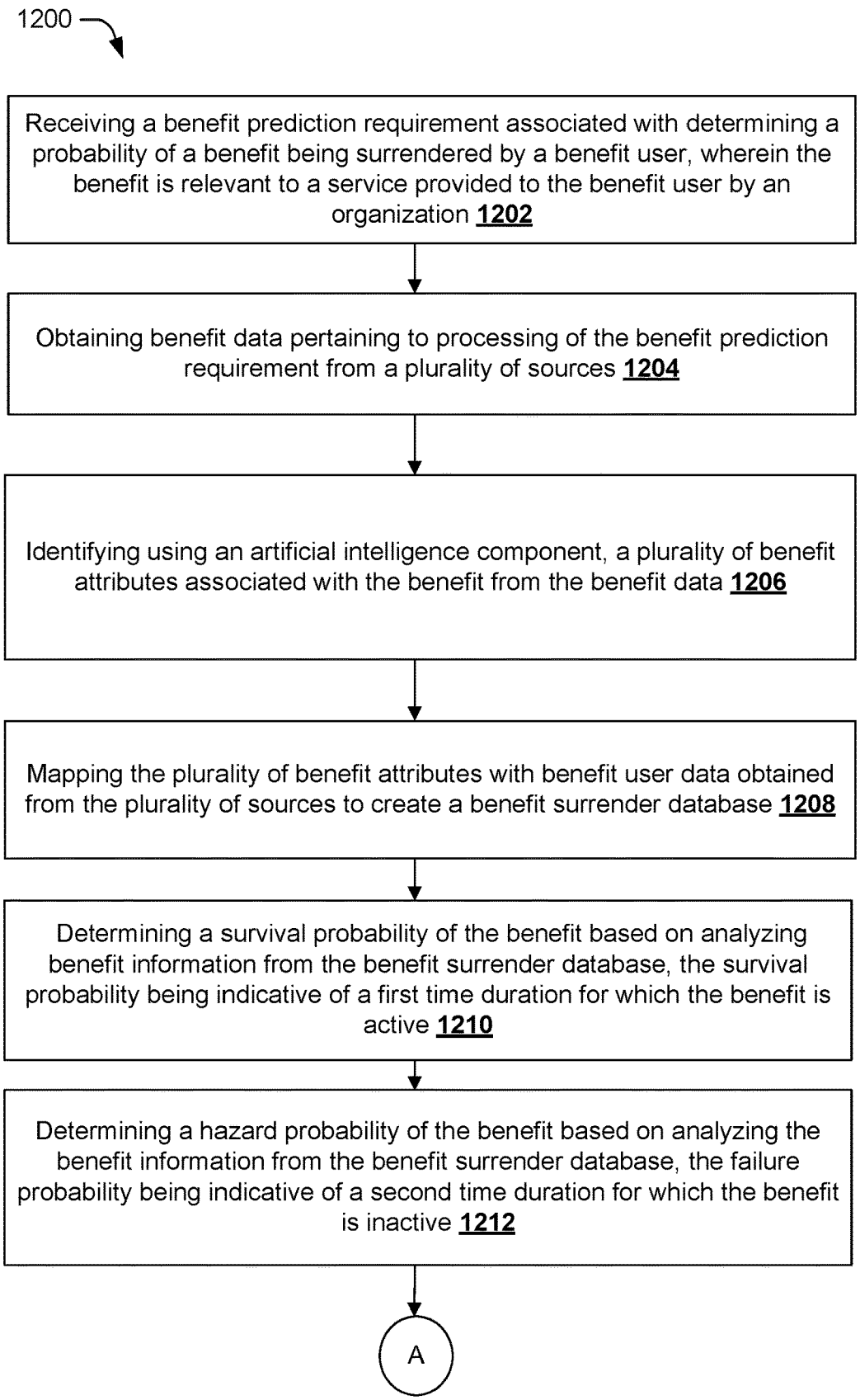
FIGS. 12A and 12B illustrate a process flowchart for benefit surrender prediction, according to an example embodiment of the present disclosure.
Figure 12B:
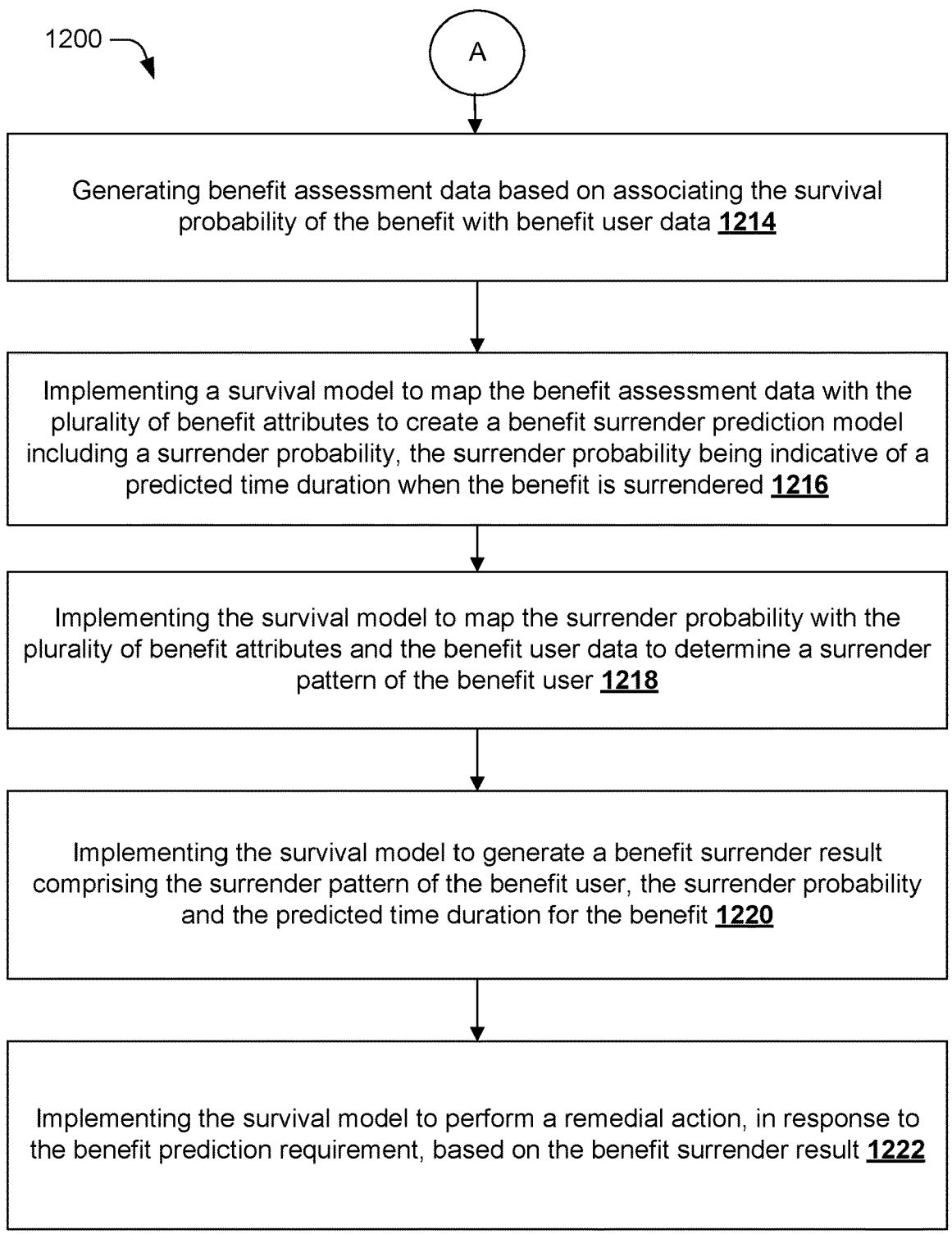

FIGS. 12A and 12B illustrate a process flowchart for baggage weight prediction using the benefit surrender prediction system 110, according to an example embodiment of the present disclosure. It should be understood that method steps are shown here for reference only and other combinations of the steps may be possible. Further, the method 1200 may contain some steps in addition to the steps shown in FIG. 12. For the sake of brevity, construction, and operational features of the system 110 which are explained in detail in the description of FIGS. 1-11 are not explained in detail in the description of FIGS. 12A and 12B. The method 1200 may be performed by a component of the system 110.

At block 1202, a benefit prediction requirement may be received associated with determining a probability of the benefit 204 being surrendered by the benefit user 212. The benefit 204 may be relevant to a service provided to the benefit user 212 by an organization.

At block 1204, benefit data pertaining to the processing of the benefit prediction requirement 202 may be obtained from a plurality of sources.

At block 1206, using the artificial intelligence component 210, the benefit attributes 208 may be identified associated with the benefit 204 from the benefit data.

At block 1208, the benefit attributes 208 may be mapped with benefit user data obtained from the data sources to create the benefit surrender database 206.

At block 1210, the survival model 224 may be implemented to determine the survival probability 214 of the benefit based on analyzing benefit information from the benefit surrender database 206. The survival probability 214 may be indicative of the first time duration 216 for which the benefit 204 may be active.

At block 1212, the survival model 224 may be implemented to determine the hazard probability 218 of the benefit 204 based on analyzing the benefit information from the benefit surrender database 206. The hazard probability 218 may be indicative of the second time duration 220 for which the benefit 204 may be inactive.

At block 1214, the survival model 224 may be implemented to generate benefit assessment data 222 based on associating the survival probability 214 hazard probability of the benefit 204 with benefit user data.

At block 1216, the survival model 224 may be implemented to map the benefit assessment data 222 with the benefit attributes 208 to create the benefit surrender prediction model 226 including the surrender probability 228. The surrender probability 228 may be indicative of the predicted time duration 230 when the benefit 204 may be surrendered.

At block 1218, the survival model 224 may be implemented to map the surrender probability 228 with the benefit attributes 208 and the benefit user data to determine the surrender pattern 240 of the benefit user.

At block 1220, the survival model 224 may be implemented to generate the benefit surrender result 234 comprising the surrender pattern 240 of the benefit user, the surrender probability 228, and the predicted time duration 230 for the benefit 204.

At block 1222, the survival model 224 may be implemented to perform the remedial action 236, in response to the benefit prediction requirement 202, based on the benefit surrender result 234.

In accordance with various embodiments of the present disclosure, the method 1200 may further comprise transforming the benefit data obtained from the data sources to create the harmonized benefit dataset, wherein the benefit surrender database 206 may include the harmonized benefit dataset. The method 1200 may further comprise performing the exploratory data analysis of the benefit surrender database 206 to determine the first time duration 216 and the second time duration 220. In an example embodiment, the second time duration 220 may be a successive time interval to the first time duration 216. The method 1200 may further comprise mapping the surrender probability 228 of the benefit 204 with the attribute index 238 for each user to determine the surrender pattern 240 for the benefit user 212. The method 1200 may further include mapping the survival probability 214 of the benefit 204 with the hazard probability 218 of the benefit 204 to determine the surrender probability 228 and the predicted time duration 230.

The method 1200 may be practiced over a non-transitory computer-readable medium including machine readable instructions that are executable by a processor.

The present disclosure provides efficient benefit surrender prediction that may account for the various factors mentioned above, amongst others. The present disclosure provides a robust approach to identify a set of benefits that may eventually get surrendered to help an associated organization to take up needful strategic action for minimizing the impact of the same. Additionally, estimation of the time of occurrence of the benefit surrender may enable appropriate actions to prevent the benefit surrender and hence enhance the client retention for an organization. Furthermore, the benefit surrender prediction may present an optimized solution, which may handle large data with lesser computational resource consumption and predict survivability of benefits at different time brackets such as years, months, and quarters.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth with respect to illustration only and are not meant as limitations. Many variations are possible within the spirit and scope of the subject matter, which is intended to be defined by the following claims and their equivalents in which all terms are meant in their broadest reasonable sense unless otherwise indicated.

The invention claimed is:

1. A system comprising:
a processor; and
a memory storing instructions, which when executed by the processor, cause the system to:
   receive a benefit prediction requirement associated with determining a probability of a benefit being surrendered by a benefit user, wherein the benefit is associated with to a service provided to the benefit user by an organization;
   obtain benefit data pertaining to processing of the benefit prediction requirement from a plurality of sources;
   identify a plurality of benefit attributes associated with the benefit from the benefit data, wherein the plurality of benefit attributes are identified based on techniques selected among artificial intelligence techniques and extract transform load (ETL) techniques according to size of the benefit data;
   map the plurality of benefit attributes with benefit user data obtained from the plurality of sources to create a benefit surrender database;
   determine a survival probability of the benefit based on analyzing benefit information from the benefit surrender database, the survival probability being indicative of a first time duration for which the benefit is active;

determine a hazard probability of the benefit based on analyzing the benefit information from the benefit surrender database, the hazard probability being indicative of a second time duration for which the benefit is inactive;

generate benefit assessment data based on associating the survival probability and hazard. probability of the benefit with benefit user data, herein the benefit assessment data facilitates identification and categorization of benefit users according to the survival probability and the hazard probability; and implement the neural network-based deep learning survival model to:

map the benefit assessment data with the plurality of benefit attributes to create a benefit surrender prediction model including a surrender probability, the surrender probability being indicative of a predicted time duration when the benefit is surrendered, wherein the surrender probability is determined by downsizing the benefit assessment data using a max-pooling operation including one or more max pooling layers of the benefit surrender prediction model;

map the surrender probability with the plurality of benefit attributes and the benefit user data to determine a surrender pattern of the benefit user;

generate a benefit surrender result comprising the surrender pattern of the benefit user, the surrender probability and the predicted time duration for the benefit; and perform a remedial action, in response to the benefit prediction requirement, based on the benefit surrender result.

2. The system as claimed in claim 1, wherein the processor transforms the benefit data obtained from the plurality of sources to create a harmonized benefit dataset, wherein the benefit surrender database includes the harmonized benefit dataset.

3. The system as claimed in claim 1, wherein the processor performs an exploratory data analysis of the benefit surrender database to determine the first time duration and the second time duration.

4. The system as claimed in claim 3, wherein the second time duration is a successive time interval to the first time duration.

5. The system as claimed in claim 1, wherein the benefit surrender database includes an attribute index for the benefit user, the attribute index comprising a benefit attribute from the plurality of benefit attributes associated with a corresponding benefit user.

6. The system as claimed in claim 5, wherein the processor maps the surrender probability of the benefit with the attribute index for each user to determine the surrender pattern for the benefit user.

7. The system as claimed in claim 1, wherein the processor maps the survival probability of the benefit with the hazard probability of the benefit to determine the surrender probability and the predicted time duration.

8. A method comprising:

receiving, by a processor, a benefit prediction requirement associated with determining a probability of a benefit being surrendered by a benefit user, wherein the benefit is relevant to a. service provided to the benefit user by an organization;

obtaining, by the processor, benefit data pertaining to processing of the benefit prediction requirement from a plurality of sources;

identifying, by the processor, a plurality of benefit attributes associated with the benefit from the benefit data, wherein the plurality of benefit attributes are identified based on techniques selected among artificial intelligence techniques and extract transform load (ETL) techniques according to size of the benefit data:

mapping, by the processor, the plurality of benefit attributes with benefit user data obtained from the plurality of sources to create a benefit surrender database;

determining, by the processor, a survival probability of the benefit based on analyzing benefit information from the benefit surrender database, the survival probability being indicative of a first time duration for which the benefit is active;

determining, by the processor, a hazard probability of the benefit based on analyzing the benefit information from the benefit surrender database, the hazard probability being indicative of a second time duration for which the benefit is inactive;

generating, by the processor, benefit assessment data based on associating the survival probability hazard probability of the benefit with benefit user data, wherein the benefit assessment data facilitates identification and categorization of benefit users according to the survival probability and the hazard probability; and implementing, by the processor, a neural network-based deep learning survival model to:

map the benefit assessment data with the plurality of benefit attributes to create a benefit surrender prediction model including a surrender probability, the surrender probability being indicative of a predicted time duration when the benefit is surrendered, wherein the surrender probability is determined b downsizing the benefit assessment data using a max-pooling operation including one or more max-pooling layers of the benefit surrender prediction model;

map the surrender probability with the plurality of benefit attributes and the benefit user data to determine a surrender pattern of the benefit user;

generate a benefit surrender result comprising the surrender pattern of the benefit user, the surrender probability and the predicted time duration for the benefit; and perform a remedial action, in response to the benefit rediction requirement, based on the benefit surrender result.

9. The method as claimed in claim 8, wherein the method further comprise transforming, by the processor, the benefit data obtained from the plurality of sources to create a harmonized benefit dataset, wherein the benefit surrender database includes the harmonized benefit dataset.

10. The method as claimed in claim 8, wherein the method further comprise performing, by the processor, an exploratory data analysis of the benefit surrender database to determine the first time duration and the second time duration.

11. The method as claimed in claim 10, wherein the second time duration is a successive time interval to the first time duration.

12. The method as claimed in claim 8, wherein the benefit surrender database includes an attribute index for the benefit user, the attribute index comprising a benefit attribute from the plurality of benefit attributes associated with a corresponding benefit user.

13. The method as claimed in claim 12, wherein the method further comprise mapping, by the processor, the surrender probability of the benefit with the attribute index for each user to determine the surrender pattern for the benefit user.

14. The method as claimed in claim 8, wherein the method further comprise mapping, by the processor, the survival probability of the benefit with the hazard probability of the benefit to determine the surrender probability and the predicted time duration.

15. A non-transitory computer-readable medium including machine readable instructions that are executable by a processor to:
receive a benefit prediction requirement associated with determining a probability of a benefit being surrendered by a benefit user, wherein the benefit is relevant to a service provided to the benefit user by an organization;
obtain benefit data pertaining to processing of the benefit prediction requirement from a plurality of sources;
identify a plurality of benefit attributes associated with the benefit from the benefit data, wherein the plurality of benefit attributes are identified based on techniques selected among artificial intelligence techniques and extract transform load (ETL) techniques according to size of the benefit data;
map the plurality of benefit attributes with benefit user data obtained from the plurality of sources to create a benefit surrender database;
determine a survival probability of the benefit based on analyzing benefit information from the benefit surrender database, the survival probability being indicative of a first time duration for which the benefit is active;
determine a hazard probability of the benefit based on analyzing the benefit information from the benefit surrender database, the hazard probability being indicative of a second time duration for which the benefit is inactive;
generate benefit assessment data based on associating the survival probability hazard probability of the benefit with benefit user data wherein the benefit assessment data facilitates identification and categorization of benefit users according to the survival probability and the hazard probability; and
implement a neural network-based deep learning survival model to:
map the benefit assessment data with the plurality of benefit attributes to create a benefit surrender prediction model including a surrender probability, the surrender probability being indicative of a predicted time duration when the benefit is surrendered, wherein the surrender probability is determined by downsizing the benefit assessment data using a max-pooling operation includin. one or more max pooling layers of the benefit surrender prediction model;
map the surrender probability with the plurality of benefit attributes and the benefit user data to determine a surrender pattern of the benefit user;
generate a benefit surrender result comprisi he surrender pattern of the benefit user, the surrender probability and the predicted time duration for the benefit; and
perform a remedial action, in response to the benefit prediction requirement, based on the benefit surrender result.

16. The non-transitory computer-readable medium of claim 15, wherein the processor is to transform the benefit data obtained from the plurality of sources to create a harmonized. benefit dataset, wherein the benefit surrender database includes the harmonized benefit dataset.

17. The non-transitory computer-readable medium of claim 15, wherein the processor is to perform an exploratory data analysis of the benefit surrender database to determine the first time duration and the second time duration.

18. The non-transitory computer-readable medium of claim 17, wherein the processor is to the second time duration is a successive time interval to the first time duration.

19. The non-transitory computer-readable medium of claim 15, wherein the benefit surrender database includes an attribute index for the benefit user, the attribute index comprising a benefit attribute from the plurality of benefit attributes associated with a corresponding benefit user.

20. The non-transitory computer-readable medium of claim 15, wherein the processor is to map the survival probability of the benefit with the hazard probability of the benefit to determine the surrender probability and the predicted time duration.

* * * * *

UNITED STATES PATENT AND TRADEMARK OFFICE
CERTIFICATE OF CORRECTION

PATENT NO. : 11,295,325 B2
APPLICATION NO. : 16/915708
DATED : April 5, 2022
INVENTOR(S) : Vijay More et al.

It is certified that error appears in the above-identified patent and that said Letters Patent is hereby corrected as shown below:

In the Claims

At Claim 1, Line 10 from the top, the phrase "hazard. probability" should instead read "hazard probability"

At Claim 1, Line 11 from the top, the word "herein" should instead read "wherein"

At Claim 8, Line 6 from the top, the phrase "plurality.sup.- of" should instead read "plurality of"

At Claim 8, Lines 9 and 10 from the top, the phrase "data: mapping" should instead read "data; mapping"

At Claim 8, Line 48 from the top, the phrase "benefit rediction" should instead read "benefit prediction"

At Claim 15, Line 10 from the top, the phrase "includin. one" should instead read "including one"

At Claim 15, Line 15 from the top, the phrase "comprisi he" should instead read "comprising the"

Signed and Sealed this
Seventeenth Day of January, 2023

*Katherine Kelly Vidal*

Katherine Kelly Vidal
*Director of the United States Patent and Trademark Office*